US012567087B2

(12) United States Patent
Morris et al.

(10) Patent No.: US 12,567,087 B2
(45) Date of Patent: Mar. 3, 2026

(54) COORDINATED DEPLOYMENT OF ENLARGED GRAPHICAL COMMUNICATIONS IN DISPENSING ENVIRONMENTS

(71) Applicant: Wayne Fueling Systems LLC, Austin, TX (US)

(72) Inventors: John Joseph Morris, Austin, TX (US); Scott R. Negley, Austin, TX (US); Dan Seymour, III, Round Rock, TX (US); Meer Parekh, Karachi (PK); Jerzy Zyglowicz, Wieliczka (PL)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 18/660,367

(22) Filed: May 10, 2024

(65) Prior Publication Data

US 2024/0378639 A1 Nov. 14, 2024

Related U.S. Application Data

(60) Provisional application No. 63/501,878, filed on May 12, 2023.

(51) Int. Cl.
*G06Q 30/02* (2023.01)
*G06Q 30/0251* (2023.01)

(52) U.S. Cl.
CPC ................................ *G06Q 30/0251* (2013.01)

(58) Field of Classification Search
CPC ........... G06Q 30/0251; G06Q 30/0268; G06Q 30/0269; G07F 9/002; G07F 9/023
See application file for complete search history.

(56) References Cited

U.S. PATENT DOCUMENTS 7,997,484 B2 * 8/2011 Godwin .................. G07F 17/16
235/381
10,214,411 B2 2/2019 Fieglein et al.
(Continued)

FOREIGN PATENT DOCUMENTS

EP 3324370 A1 5/2018

OTHER PUBLICATIONS

"Introducing the DFS Anthem UX user experience platform" (published by Dover Fueling Solutions on Jul. 17, 2020 at https://www.youtube.com/watch?v=fxh_q8ZjeJU) (Year: 2020).*
(Continued)

*Primary Examiner* — James M Detweiler
(74) *Attorney, Agent, or Firm* — Mintz, Levin, Cohn, Ferris, Glovsky and Popeo, P.C. US

(57) ABSTRACT

Systems and methods for displaying graphical communications includes receiving first data characterizing a state of one or more of a plurality of dispensers. Second data can be received characterizing a playlist of media content to be displayed on one or more of the plurality of dispensers. The playlist of media content can identify one or more media files including at least one graphical user interface depiction to be provided on a display screen of the one or more of the plurality of dispensers. A media file and period of time during which the at least one graphical user interface depiction is to be provided on the display screen of the one or more of the plurality of dispensers can be determined and the at least one graphical user interface depiction can be provided on the display screen during the period of time.

19 Claims, 11 Drawing Sheets

(56) References Cited

U.S. PATENT DOCUMENTS

| | | | |
|---|---|---|---|
| 10,269,082 B2 | 4/2019 | Morris et al. | |
| 10,577,237 B2 | 3/2020 | Fieglein | |
| 10,726,508 B2 | 7/2020 | Morris et al. | |
| 11,276,051 B2 | 3/2022 | Tang et al. | |
| 11,429,945 B2 | 8/2022 | Fieglein et al. | |
| 11,443,582 B2 | 9/2022 | Derby | |
| 2001/0049626 A1* | 12/2001 | Nicholson | G06Q 20/342 |
| | | | 705/14.23 |
| 2007/0132660 A1* | 6/2007 | Nuttall | G07G 1/14 |
| | | | 345/2.2 |
| 2007/0198127 A1 | 8/2007 | Tam et al. | |
| 2010/0268792 A1* | 10/2010 | Butler | G06Q 30/02 |
| | | | 715/810 |
| 2016/0027231 A1* | 1/2016 | Guzzone | G07F 9/0235 |
| | | | 705/16 |
| 2017/0134466 A1* | 5/2017 | Giladi | H04N 21/26258 |
| 2017/0308965 A1* | 10/2017 | Morris | B67D 7/04 |
| 2020/0293567 A1* | 9/2020 | Fieglein | H04L 67/14 |
| 2022/0198508 A1* | 6/2022 | Giera | G06Q 30/0242 |
| 2023/0103400 A1 | 4/2023 | Hairston et al. | |
| 2023/0196360 A1 | 6/2023 | Weston et al. | |

OTHER PUBLICATIONS

"Anthem UX User Experience Platform Product Demo" (published by Dover Fueling Solutions on Nov. 18, 2020 at https://www.youtube.com/watch?v=wGV3xFITLGI) (Year: 2020).*

International Search Report and Written Opinion received for PCT Application No. PCT/US2024/028724, mailed on Jul. 1, 2024, 14 pages.

* cited by examiner

*100c*
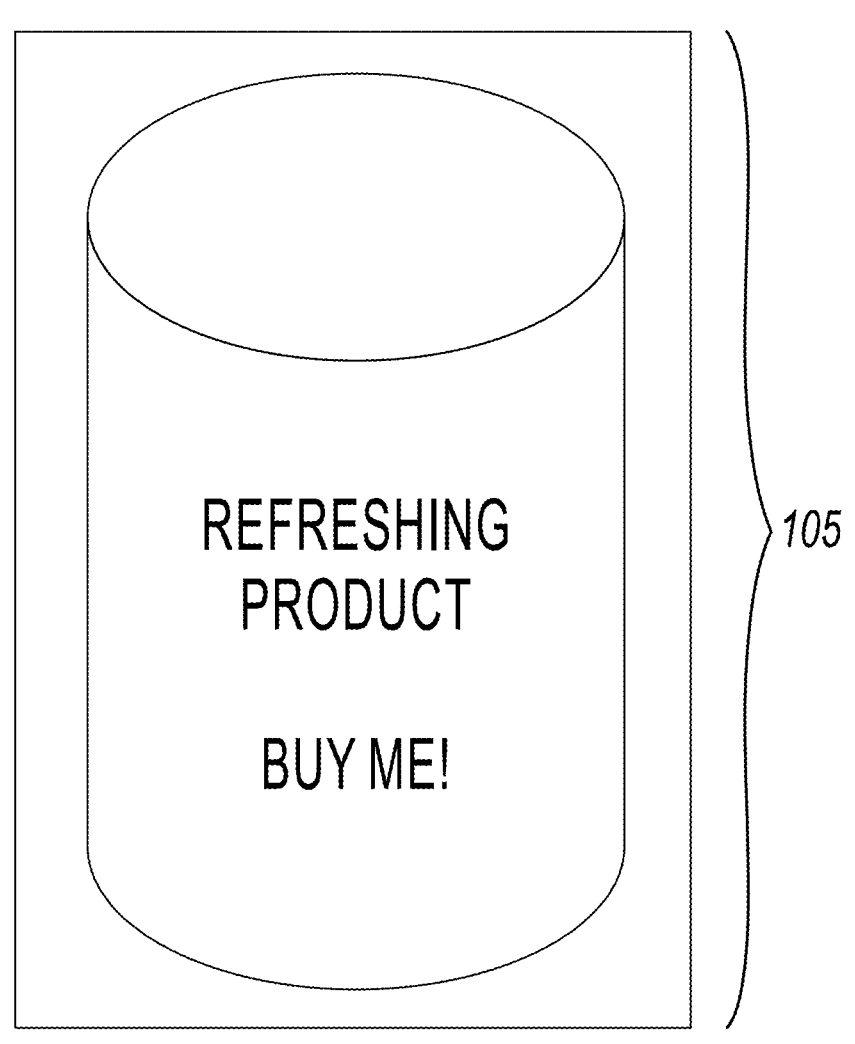
REFRESHING
PRODUCT
BUY ME!
105
FIG. 1C

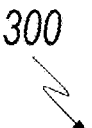

*300*

| Receiving first data characterizing a state of one or more of a plurality of dispensers | ⟩~310 |

Receiving second data characterizing a playlist of media content to be displayed on one or more of the plurality of dispensers, the playlist of media content identifying one or more media files including at least one graphical user interface depiction to be provided on a display screen of one or more of the plurality of dispensers ⟩~320

Determining, based on the playlist of media content, a media file in the playlist including the at least one graphical user interface depiction and a period of time during which the at least one graphical user interface depiction is to be provided on the display screen of one or more of the plurality of dispensers ⟩~330

Causing the at least one graphical user interface depiction to be provided on the display screen of the one or more of the plurality of dispensers during the period of time ⟩~340

FIG. 3

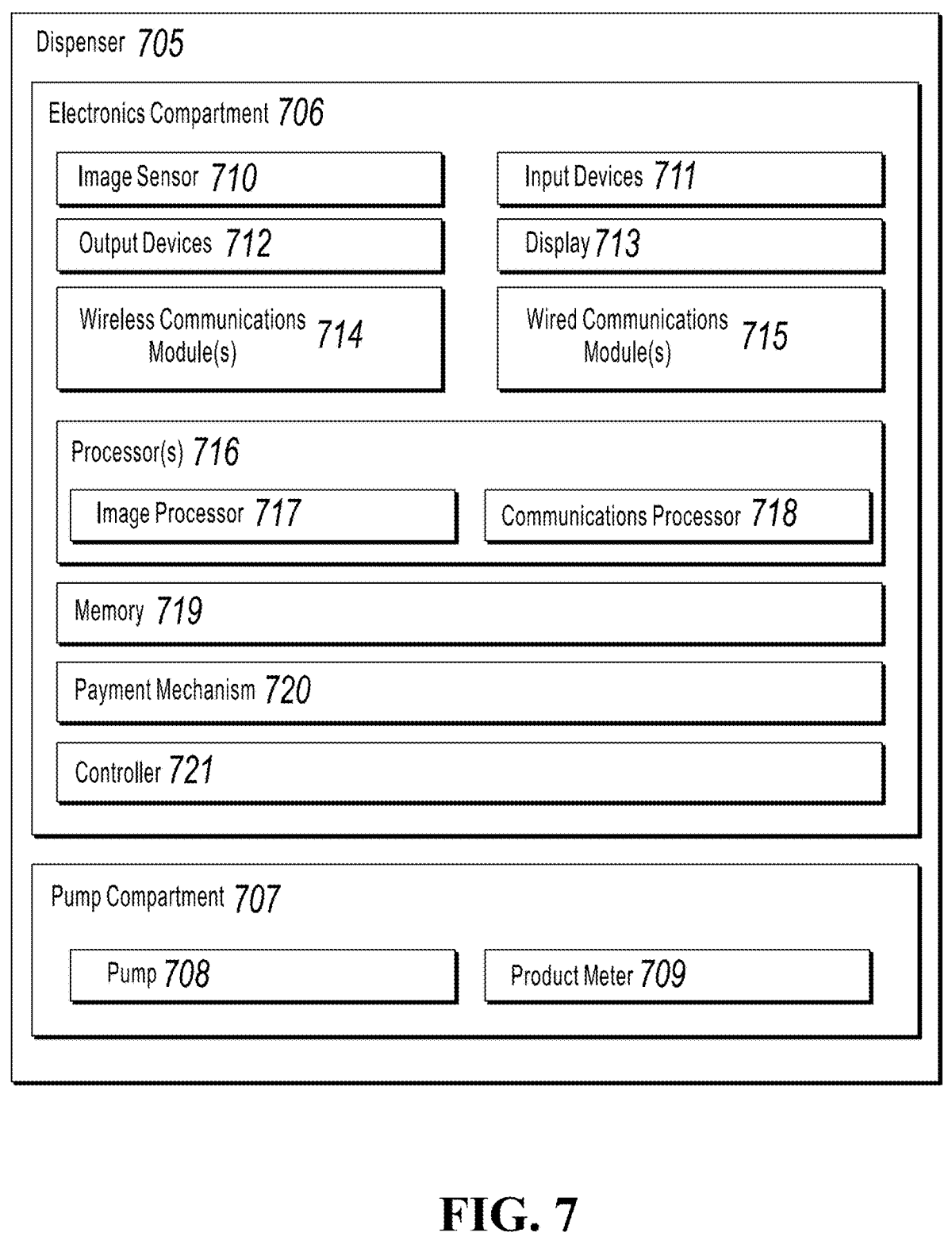

Dispenser *705*

Electronics Compartment *706*

| Image Sensor *710* | Input Devices *711* |
| Output Devices *712* | Display *713* |
| Wireless Communications Module(s) *714* | Wired Communications Module(s) *715* |

Processor(s) *716*

| Image Processor *717* | Communications Processor *718* |

Memory *719*

Payment Mechanism *720*

Controller *721*

Pump Compartment *707*

| Pump *708* | Product Meter *709* |

FIG. 7

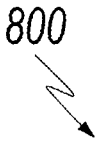
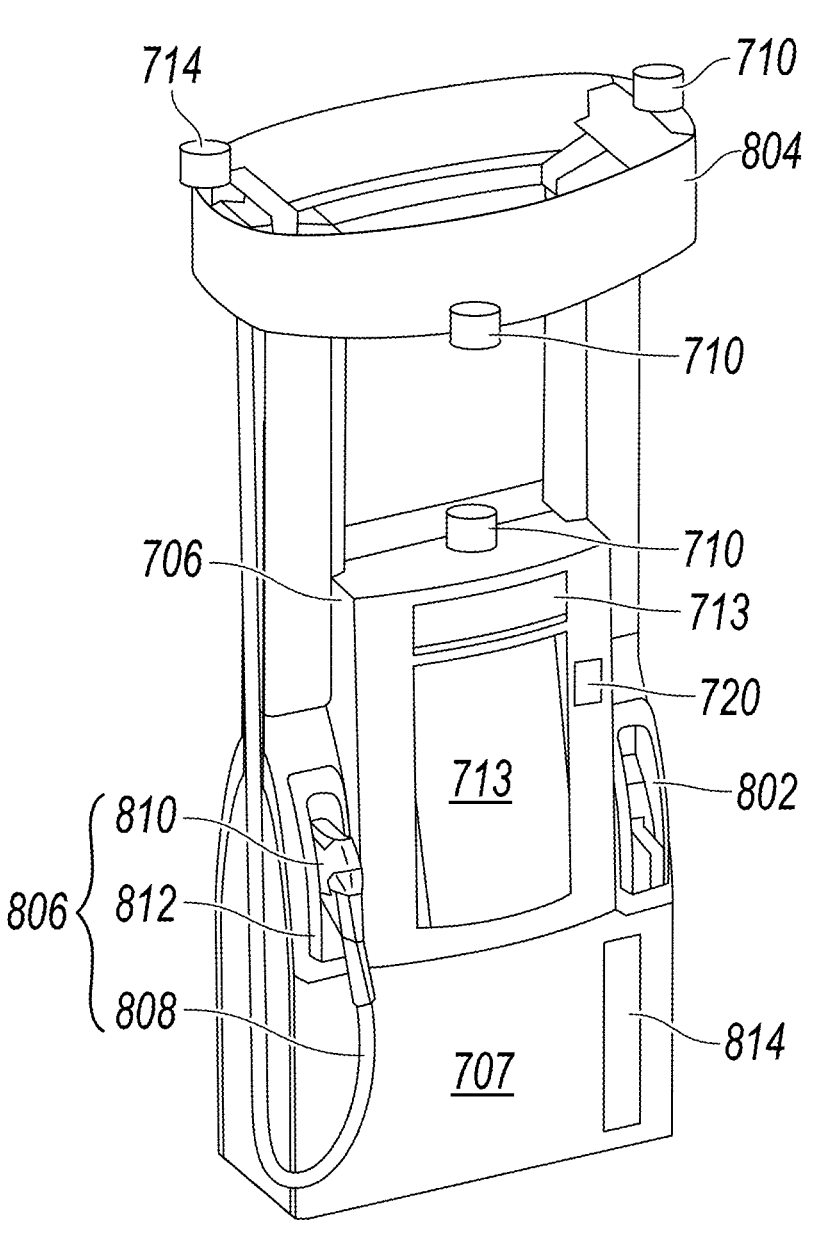
FIG. 8

900

902

904

904

910

908

908

906

COORDINATED DEPLOYMENT OF ENLARGED GRAPHICAL COMMUNICATIONS IN DISPENSING ENVIRONMENTS

CROSS-REFERENCE TO RELATED APPLICATIONS

This application claims priority to U.S. Provisional Patent Application No. 63/501,878 filed May 12, 2023, entitled "Coordinated Deployment of Enlarged Graphical Communications in Dispensing Environments" which is hereby incorporated herein by reference in its entirety.

FIELD

Methods and systems for coordinated deployment of enlarged graphical communications in dispensing environments are provided.

BACKGROUND

Dispensing environments can provide fuel, electricity, gas, or similar consumable products or energy-generating materials to vehicles via dispensers. Vehicle operators can enter the dispensing environment to purchase fuel, gas, or electricity for their vehicle. Often, dispensing environments offer other items or services for purchase, such as food, drinks, vehicle maintenance equipment, vacuum, air, repair services, or car washes.

Marketing efforts by dispensing environment operators can be limited to traditional modes of marketing such as word of mouth, signage, flyers, posters, social media, or similar sponsored content items within the dispensing environment to attract customers and command revenue/sales sufficient to sustain profitability. However, at times it can be difficult to reach potential customers via these traditional marketing channels. Influencing potential customers closer to the point of sale within the dispensing environment can lead to higher rates of purchasing, increased sales, and greater customer loyalty.

Existing dispensers can be configured with displays to provide graphical communications of marketing outreach materials, such as sponsored video and audio content. However, in some environments, the displays may be relatively small or located on an upper region of the dispenser, away from the gaze of a potential customer who instead may be looking at lower regions of the dispenser when interacting with the dispenser. And, in some environments, the potential customer may be too far away from the dispenser to view the marketing outreach materials provided on the displays and/ or traveling past the dispenser at a rate of speed that is too fast to acquire the content of the marketing outreach materials.

Accordingly, a need exists for improved deployment of graphical communications in dispensing environments.

SUMMARY

Methods and systems for coordinated deployment of enlarged graphical communications in dispensing environments are provided. In one aspect, a method is provided and in one embodiment can include receiving first data characterizing a state of one or more of a plurality of dispensers. The method can also include receiving second data characterizing a playlist of media content to be displayed on one or more of the plurality of dispensers, the playlist of media content identifying one or more media files including at least one graphical user interface depiction to be provided on a display screen of the one or more of the plurality of dispensers. The method can further include determining, based on the playlist of media content, a media file in the playlist including the at least one graphical user interface depiction and a period of time during which the at least one graphical user interface depiction is to be provided on the display screen of the one or more of the plurality of dispensers. The method can also include causing the at least one graphical user interface depiction to be provided on the display screen of the one or more of the plurality of dispensers during the period of time.

In some embodiments, the state can include an idle operating state in which the one or more dispensers inactive dispensing a product therefrom or a dispensing operating state in which the one or more dispensers are active dispensing the product therefrom. In some embodiments, the method can further include determining a first instance of the at least one graphical user interface depiction based on the idle operating state or determining a second instance of the at least one graphical user interface depiction based on the dispensing operating state. The second instance can be different than the first instance. The method can also include providing the determined first or second instance of the at least one graphical user interface depiction as the second data.

In some embodiments, the at least one graphical user interface depiction is displayed on the display screen based on one or more parameters assigned to respective media files of the one or more media files. In some embodiments, the one or more parameters can include a display format of the at least one graphical user interface depiction, a state of a retail facility collocated with the one or more dispensers, and the state of the one or more dispensers. In some embodiments, the playlist of media content can include computer-readable instructions configured to cause the at least one graphical interface depiction to include a large-format graphical communication for display at one or more intermittent periods within the period of time. In some embodiments, the at least one graphical user interface depiction can be provided synchronously on display screens of a first plurality of dispensers of the plurality of dispensers during the period of time and the at least one graphical user interface depiction is provided asynchronously on display screens of a second plurality of dispensers of the plurality of dispensers, different than the first plurality of dispensers, during the period of time.

In some embodiments, the period of time can include a duration of time unassociated with a time of day, a duration of time within a range of time periods occurring during a day, or a duration of time associated with a day of a week, a month, or a recurring interval of future days. In some embodiments, the at least one graphical user interface depiction can include a first graphical user interface depiction including a first data graphic associated with an amount of a dispensed product and a price of the dispensed product, a first sponsored content graphic, and a button interface graphic comprising a plurality of buttons associated with grades of a dispensed product, and a second graphical user interface depiction including a second data graphic associated with the amount of the dispensed product and the price of the dispensed product, and a second sponsored content graphic provided as a large-format graphical communication. In some embodiments, the first graphical user interface depiction and the second graphical user interface depiction are alternatively provided on the display screen in a cyclic manner.

In another aspect, a system is provided and in one embodiment can include at least one data processor and a memory storing instructions, which when executed cause the at least one data processor to perform operations including receiving first data characterizing a state of one or more of a plurality of dispensers. The operations can also include receiving second data characterizing a playlist of media content to be displayed on one or more of the plurality of dispensers, the playlist of media content identifying one or more media files including at least one graphical user interface depiction to be provided on a display screen of the one or more of the plurality of dispensers. The operations can further include determining, based on the playlist of media content, a media file in the playlist including the at least one graphical user interface depiction and a period of time during which the at least one graphical user interface depiction is to be provided on the display screen of the one or more of the plurality of dispensers. The operations can also include causing the at least one graphical user interface depiction to be provided on the display screen of the one or more of the plurality of dispensers during the period of time.

In some embodiments, the state can include an idle operating state in which the one or more dispensers inactive dispensing a product therefrom or a dispensing operating state in which the one or more dispensers are active dispensing the product therefrom. In some embodiments, the operations can further include determining a first instance of the at least one graphical user interface depiction based on the idle operating state or determining a second instance of the at least one graphical user interface depiction based on the dispensing operating state. The second instance can be different than the first instance. The method can also include providing the determined first or second instance of the at least one graphical user interface depiction as the second data.

In some embodiments, the at least one graphical user interface depiction is displayed on the display screen based on one or more parameters assigned to respective media files of the one or more media files. In some embodiments, the one or more parameters can include a display format of the at least one graphical user interface depiction, a state of a retail facility collocated with the one or more dispensers, and the state of the one or more dispensers. In some embodiments, the playlist of media content can include computer-readable instructions configured to cause the at least one graphical interface depiction to include a large-format graphical communication for display at one or more intermittent periods within the period of time. In some embodiments, the at least one graphical user interface depiction can be provided synchronously on display screens of a first plurality of dispensers of the plurality of dispensers during the period of time and the at least one graphical user interface depiction is provided asynchronously on display screens of a second plurality of dispensers of the plurality of dispensers, different than the first plurality of dispensers, during the period of time.

In some embodiments, the period of time can include a duration of time unassociated with a time of day, a duration of time within a range of time periods occurring during a day, or a duration of time associated with a day of a week, a month, or a recurring interval of future days. In some embodiments, the at least one graphical user interface depiction can include a first graphical user interface depiction including a first data graphic associated with an amount of a dispensed product and a price of the dispensed product, a first sponsored content graphic, and a button interface graphic comprising a plurality of buttons associated with grades of a dispensed product, and a second graphical user interface depiction including a second data graphic associated with the amount of the dispensed product and the price of the dispensed product, and a second sponsored content graphic provided as a large-format graphical communication. In some embodiments, the first graphical user interface depiction and the second graphical user interface depiction are provided on the display screen in a cyclic manner.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 1C is an illustration of an exemplary embodiment of a third view of the user interface of FIG. 1A in which an enlarged graphical communication displayed to a user occupies an entirety of a display;

FIG. 3 is a process flow diagram illustrating an example method of providing coordinated deployment of enlarged graphical communications in dispensing environments;

FIG. 7 is a system block diagram of a dispenser in the dispensing system of FIG. 6;

FIG. 8 is a diagram illustrating a perspective view of an embodiment of the dispenser of FIGS. 6 and 7 configured to dispense a liquid product;

DETAILED DESCRIPTION

Figures 1A, 1B:
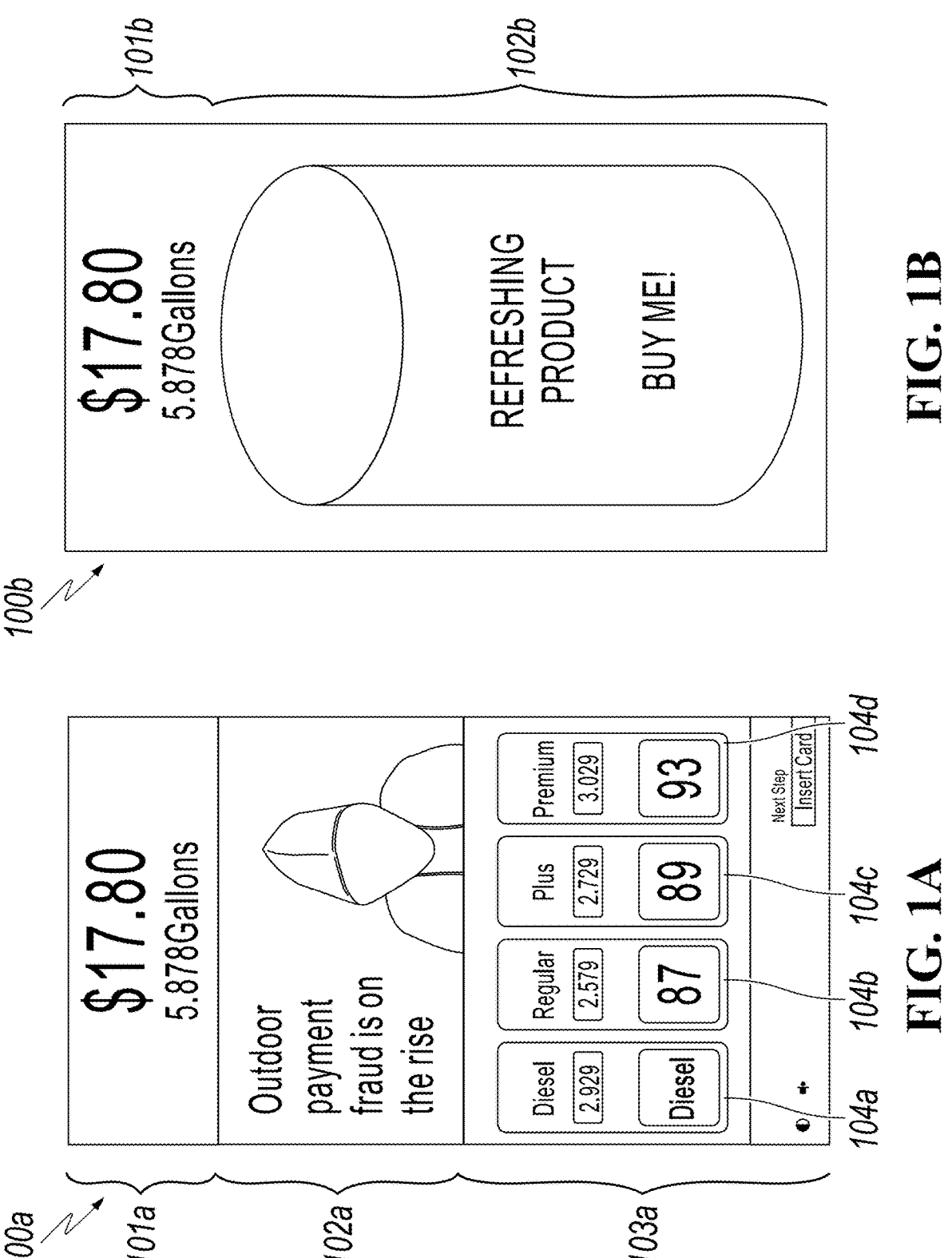
FIG. 1A is an illustration of an exemplary embodiment of a first view of a user interface of a dispenser in which interactive graphical buttons are displayed to a user.
FIG. 1B is an illustration of an exemplary embodiment of a second view of the user interface of FIG. 1A in which an enlarged graphical communication is displayed to a user.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

As described earlier, operators of dispensing environments seek to maximize sales and profits using existing resources in the most efficient manner possible. Traditional sponsored content and promotional marketing materials may fall short of capturing existing or new customers in order to increase sales and profits. Many traditional sponsored content and promotional materials delivery methods at dispensers provide relatively small format graphical communications to prospective customers. As a result, users may not be receptive to the promotional content provided in the small format graphical communications and fail to participate in the promotional offer. Thus, with the relatively small format graphics provided by many dispensers, the probability that a user will accept, agree, or otherwise participate or utilize a promotional offer may be low. An improved promotional system would be able to provide large-format graphical communications characterizing sponsored content and promotional materials during one or more periods of time during which the dispenser is powered on, that are visually enticing and attractive to a prospective customer. As a result, the probability that a user will accept, agree, or otherwise participate or utilize a promotional offer may be higher than as compared to many traditional sponsored content and promotional materials delivery methods.

In some implementations, it may be advantageous to simultaneously provide the above-described large format graphical communications at multiple locations at a dispensing station. This, for example, may be particularly eye-catching to a passerby who may not visually notice the large-format graphical communications unless they are simultaneously presented at multiple locations at the dispensing station. As a result, the probability that a user will accept, agree, or otherwise participate or utilize a promotional offer may be higher than as compared to many traditional sponsored content and promotional materials delivery methods.

In general, a system for providing large-format, enlarged graphical communications on a dispenser and for providing coordinated deployment of enlarged graphical communications in dispensing environments, and methods for use thereof, are provided. The graphical communications can include photo or video depictions (with or without accompanying audio) that characterize sponsored content, promotions, coupons, rebates, or marketing materials associated with product or service offerings available in the dispensing environment or in related locations or contexts associated with an operator of the dispensing environment. The graphical communication could correspond to an offer for a fuel discount, an electricity discount, a gas discount, a car wash, a beverage, a diagnostic or repair service, or the like. The system can present the large-format graphical communication on a display of the dispenser at optimized times before, during, and/or after an interaction of a user with the dispenser. The system can begin and/or end the presentation of the large-format graphical communication in response to one or more events during such an interaction. The system can coordinate the presentation of the large-format graphical communication across multiple dispensers and/or graphical displays at a dispensing environment (e.g., a fueling station, an electric charging station, etc.) such that the large-format graphical communication can be simultaneously displayed across the multiple dispensers and/or graphical displays.

FIG. 1A illustrates an exemplary embodiment of a first view 100A of a user interface that can be displayed on an interactive graphical display of a dispenser. In this exemplary embodiment, the interface can be that of a dispenser as described herein. As shown, in this view, the user interface features a price/amount graphic 101A illustrating an amount of fuel (in gallons or any other volumetric unit) that has been dispensed from the dispenser as well as a price of the amount of fuel that has been dispensed from the dispenser. Below the price/amount graphic 101A can be a first graphical communication 102A characterizing a first sponsored content item. In some embodiments, the first graphical communication 102A can be stored on a memory of the dispenser. In some embodiments, the first graphical communication 102A can be transmitted to the dispenser from a remote server/database in operable communication with the dispenser and stored on the memory of the dispenser. In some embodiments, instructions that cause the first graphical communication 102A to be displayed in the user interface during a period of time can be transmitted to the dispenser from the remote server/database for implementation by at least one data processor in operable communication with the remote server/database and the interactive graphical display of the dispenser. In some embodiments, the instructions causing the first graphical communication 102A to be displayed in the user interface can be retrieved from the memory of the dispenser and implemented by at least one data processor in operable communication with the memory and the interactive graphical display of the dispenser.

As shown in FIG. 1A, the first graphical communication 102A is placed below the price/amount graphic 101A and above a buttons interface graphic 103A that is configured to permit a user of the dispenser to enable the dispenser to perform one or more operations. For example, in this embodiment, the buttons interface graphic 103A includes a plurality of grade buttons 104A-D (e.g., Diesel grade button 104A, 87 octane fuel grade button 104B, 89 octane fuel grade button 104C, and 93 octane grade button 104D) which, when selected by a user interacting with the user interface, causes the dispenser to dispense a type/grade of fuel in accordance with the user's selection. In some embodiments, the first view 100A can be displayed on the dispenser when the dispenser is being actively occupied by a user engaging the dispenser to receive a product (e.g., fuel, electricity, etc.) from the dispenser or to order a product available at other locations at a dispensing environment (e.g., in-store items, carwash visit, etc.) via the dispenser. In some embodiments, the first view 100A can be displayed at one or more other operating states (e.g., an idle state during which a user is not actively occupying/engaging the dispenser for purposes of receiving a product from the dispenser or ordering a product available at other locations at the dispensing environment, etc.) Additionally, in some embodiments, the dispenser may include one or more speakers configured to play audio associated with the first graphical communication 102A when the first graphical communication 102A is presented by the user interface. In some embodiments, the user interface may present the first view 100A with no accompanying audio played from the speakers.

FIG. 1B illustrates an exemplary embodiment of a second view 100B of a user interface that can be displayed on the interactive graphical display of the dispenser. As shown, in this second view 100B, the user interface includes a price/amount graphic 101B that is substantially the same as the price/amount graphic 101A. However, rather than feature a graphical communication and a buttons interface graphic as shown in the first view 100A, the second view 100B features a second, large-format, enlarged graphical communication 102B that is sized to occupy the region of the interactive display that is occupied by the first graphical communication 102A and the buttons interface graphic 103A when the user interface is presenting the first view 100A on the interactive display of the dispenser. The second graphical communication 102B characterizes a second, large-format sponsored content item. In some embodiments, the second view 100B can be displayed on the dispenser when the dispenser is being actively occupied by a user engaging the dispenser to receive a product (e.g., fuel, electricity, etc.) from the dispenser or to order a product available at other locations at a dispensing environment (e.g., in-store items, carwash visit, etc.) via the dispenser. In some embodiments, the second view 100B can be displayed at one or more other operating states (e.g., an idle state during which a user is not actively occupying/engaging the dispenser for purposes of receiving a product from the dispenser or ordering a product available at other locations at the dispensing environment etc.) Additionally, in some embodiments, the dispenser may include one or more speakers configured to play audio associated with the second graphical communication 102B when the second graphical communication 102B is presented by the user interface. In some embodiments, the user interface may present the second view 100B with no accompanying audio played from the speakers.

FIG. 1C illustrates an exemplary embodiment of a third view 100C of a user interface that can be displayed on the interactive graphical display of the dispenser. As shown, in this third view 100C, the user interface includes a third graphical communication 105 that can be provided as an extended-format graphical communication that can extend or otherwise be displayed over an entirety of a display of the dispenser. For example, the third graphical communication 105 can be formatted to extend or occupy regions of the display previously displaying the price/amount graphic 101A or 101B, the first graphical communication 102A, the buttons interface graphic 103A, and/or the second graphical communication 102B described in relation to FIGS. 1A and 1B above. The third graphical communication 105 can characterize a third, extended-format sponsored content item.

In some embodiments, the third view 100C can be displayed on the dispenser when the dispenser is being actively occupied by a user engaging the dispenser to receive a product (e.g., fuel, electricity, etc.) from the dispenser or to order a product available at other locations at a dispensing environment (e.g., in-store items, carwash visit, etc.) via the dispenser. In some embodiments, the third view 100C can be displayed at one or more other operating states (e.g., an idle state during which a user is not actively occupying/engaging the dispenser for purposes of receiving a product from the dispenser or ordering a product available at other locations at the dispensing environment etc.).

In some embodiments, the third view 100C can be displayed based on business hours associated with the dispenser and/or a retail facility at which the dispenser is located. For example, the third view 100C can be displayed when a retail facility is closed for business or when a state of the dispenser is closed for use. In some embodiments, the systems and methods herein can be configured to display the third view 100C after a predetermined period of time following closure of the retail facility. For example, in some embodiments, the third view 100C can be displayed 15 minutes after the retail facility has closed. The predetermined period of time can be configured to pause display the third view 100C in order to satisfy regulatory obligations requiring display of such. The predetermined period of time can be user configured and can vary.

Additionally, in some embodiments, the dispenser may include one or more speakers configured to play audio associated with the third graphical communication 105 when the third graphical communication 105 is presented by the user interface. In some embodiments, the user interface may present the third view 100C with no accompanying audio played from the speakers.

In some embodiments, the graphical communications 102A, 102B, and/or 105 can be stored on a memory of the dispenser. In some embodiments, the graphical communications 102A, 102B, and/or 105 can be transmitted to the dispenser from a remote server/database in operable communication with the dispenser and stored on the memory of the dispenser. In some embodiments, instructions that cause the graphical communications 102A, 102B, and/or 105 to be displayed in the user interface during a period of time can be transmitted to the dispenser from the remote server/database for implementation by at least one data processor in operable communication with the remote server/database and the interactive graphical display of the dispenser. In some embodiments, the instructions causing the graphical communications 102A, 102B, and/or 105 to be displayed in the user interface can be retrieved from the memory of the dispenser and implemented by at least one data processor in operable communication with the memory and the interactive graphical display of the dispenser.

In some embodiments, the user interface can present the first view 100A, the second view 100B, the third view 100C, and/or additional views characterizing additional graphic communications serially and/or repeatedly on the interactive display of the dispenser. For example, in some embodiments, the user interface can cyclically alternate between the first view 100A and the second view 100B until a user begins to interact with the dispenser (e.g., a user approaches the dispenser such that the dispenser detects the presence of the user and/or the user's vehicle with an image sensor or any other proximity detection techniques, the user provides payment information to the dispenser, the user removes a fueling nozzle/charging cable from a receptacle on the dispenser, and the like). For example, the user interface can present the first view 100A for a first period of time, subsequently present the second view 100B for a second, following period of time, subsequently present the first view 100A for a third, following period of time, subsequently present the second view 100B for a fourth, following period of time, and so on until the user begins to interact with the dispenser.

In some embodiments, the various graphical communications provided in the views described above can be configured in a playlist of media. The playlist of media can specify one or more media files containing the graphical communications to display on the interactive graphical display of the dispenser as views described herein. The playlist of medica can define an order and a duration of the media and can further define a schedule of one or more days and/or times of day during which the one or more media files are to be displayed on the interactive graphical display. In some embodiments, the playlist of media can be created and configured by a media interface in operable communication with the dispenser. The media interface can be configured to permit a user to customize several parameters of the playlist of media, including media files, an order the media files should are to be displayed, a duration of display of the media file, and events (such as dispenser states which can include an idle dispenser state, an active dispenser state, a retail facility state, and the like) defining conditions during which the playlist is run on the dispenser, and the like. In some embodiments, the playlist can include an event specifying that a graphical communication to be during both idle and active dispenser states.

In some embodiments, the graphical communications, such as the graphical communications 102A, 102B, and 105 described above, can be created by a media interface and added to the playlist of media. One or more tags characterizing attributes or conditions for displaying the graphical communications 102A, 102B, and 105 can be created and added to the media files to denote display formats (e.g., a large-format, such as that of graphical communication 102B or an extended-format, such as that of graphical communication 105) associated with the graphical communications 102A, 102B, and/or 105. The playlist of media can provide tag data identifying one or more particular tags that have been applied to respective media files.

The tags can be used by the playlist of media to determine the desired display format that the graphical communications should be displayed in the user interface. For example, in some embodiments, a tag including syntax such as "large-format graphical communication" or the like can be added to the media file as metadata to indicate the graphical communication should be displayed in a format corresponding to graphical communication 102B shown in view 100B of FIG. 1B. Similarly, a tag including syntax such as "extended-format graphical communication" or the like, can be added to the media file to indicate the graphical communication should be displayed in a format corresponding to graphical communication 105 shown in view 100C of FIG. 1C. In some embodiments, a tag can include a two-part syntax that describes a condition term followed by a display format term. For example, a media file can be tagged with "closed_extended-format". The first term "closed" can describe a condition for which the graphical communication is displayed, such as when a retail facility at which the dispenser is located is closed such that the dispense is unavailable for use. The second term "extended-format" can describe a format for which the graphical communication is displayed, such as the extended format shown in graphical communication 105 of view 100C in FIG. 1C.

When the playlist of media is executed, the display condition and formatting preferences defined via the tags will be applied as the graphical communications associated with the tagged media files are displayed. For example, an exemplary playlist of media can include instructions that cause any media file featuring the "large-format graphical communication" tag to be displayed at one or more predetermined times within a runtime of the playlist of media. As such, when the playlist of media is provided to the dispenser for display on the interactive graphical display and the user interface plays the playlist, the user interface can, in response to instructions in the playlist to play a file tagged "large-format graphical communication," select one or more large-format graphical communications featuring the "large format graphical communication" tag stored in the metadata associated with each large-format graphical communication, and the playlist can display such a tagged large-format graphical communication on the interactive graphical display. In some embodiments, the presentation of media views (e.g., the first view 100A, the second view 100B, and/or the third view 100C described above) on the user interface can be controlled by the playlist of media. As such, the playlist of media can specify that graphical communications featuring particular tags can be presented in the user interface based on the display specifications (e.g., display condition or a display format) defined via the tags.

In some embodiments, the user interface can present a large-format graphical application user interface, similar in size to the second graphical communication 102B, that is configured to permit a user to operate one or more applications operating on the dispenser via interactions by the user with the interactive graphical display of the dispenser. Exemplary applications with which the user can interact include a Media application configured to present visual and/or audio media to a user, a Traffic application configured to provide information regarding current traffic patterns in one or more locations, a Weather application configured to provide information regarding weather in one or more locations, and the like.

The large-format graphical application user interface can, in some embodiments, occupy the graphical display space of the second graphical communication 102B. The large-format graphical application user interface can be presented and removed from display in the interactive graphical display by the user selecting, via interaction with the graphical display, a button configured to toggle between a first display state in which the large-format graphical application user interface is presented in the user interface and a second display state in which the large-format graphical application user interface is not presented in the user interface. The large-format graphical application user interface can also include one or more buttons, with which the user can interact, that permit the user to select one or more of the applications included in the large-format graphical application user interface, such as the exemplary applications described above, for interaction therewith. While the large-format graphical application user interface is presented, one or more additional features of the user interface can also be displayed, such as the price/amount graphic described above.

Figure 2:
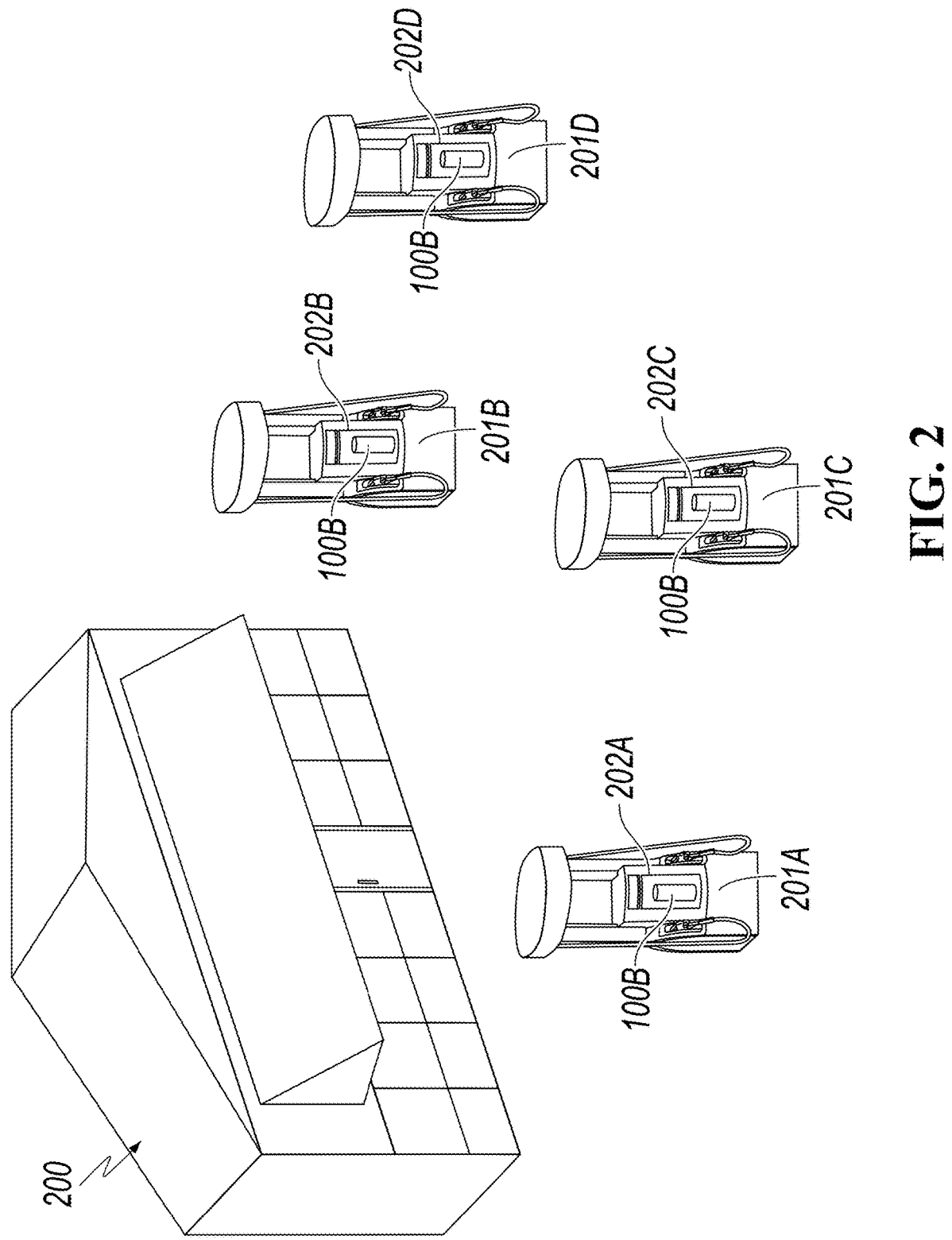
FIG. 2 is an illustration of an exemplary embodiment of coordinated deployment of enlarged graphical communications in dispensing environments.

In some embodiments, it can be advantageous to present the first view 100A, the second view 100B, and/or the third view 100C across multiple dispensers and/or displays in a synchronized manner. FIG. 2 is an illustration of an exemplary embodiment of coordinated deployment of graphical communications to more than one dispenser located in a dispensing environment 200. As illustrated in FIG. 2, the dispensing environment 200 can include a plurality of dispensers 201A-201D from which a user can receive a dispensed product. As illustrated, each of the dispensers 201A-201D includes a user interface 202A-202D providing an interactive display, as described herein. The user interfaces 202A-202D are presenting the second view 100B for a period of time in a synchronized manner. In some embodiments, the views 100A, 100C, and/or 100C can be presented synchronously on all dispensers 201 or on a subset of the dispensers 201 within the dispensing environment 200. For example, in some embodiments, the second view 100B can be presented on dispensers 201A and dispenser 201B during the same period of time, but dispenser 201C and dispenser 201D can display the first view 100A during that same period of time.

In some embodiments, synchronization of dispenser displays can be organized based on a primary-secondary model or a leader-follower model. For example, one of the dispensers 201 (such as dispenser 201A) can be designated as a primary for display purposes and the remainder of the dispensers 201B-201D can be designated as secondary for display purposes. In this way, the secondary dispensers 201B-201D will synch their user interfaces 202B-202D to the user interface 202A of dispenser 201A. In some embodiments, a particular dispenser 201 can be defined as a default primary, such that the user interfaces 202 of secondary dispensers 202 will synch to the user interface 201 of the dispenser 202 designated as the default primary dispenser. In some embodiments, the dispensing environment 200 can have multiple dispensers 201 designated as primary dispensers for display purposes and defined subsets of the remaining non-primary dispensers 201 can be designated as secondary dispensers associated with a particular primary dispenser. In some embodiments, display synchronization can be defined and coordinated based on a condition or state of the dispensing environment 200 (e.g., closed vs. open for business), a dispenser 201 (e.g., an inactive idle state or an active dispensing state) or the like. The designation of a particular dispenser as a primary or secondary dispenser can be made at the dispenser 201 via a dispenser setting application configured therein.

FIG. 3 is a process flow diagram illustrating an example method 300 of providing coordinated deployment of enlarged graphical communications in dispensing environments. At 310, first data characterizing a state of one or more of a plurality of dispensers can be received. The state of each of the plurality of dispensers characterized by the first data can be an operating state of the one or more of the plurality of dispensers. Exemplary operating states include an idle state (e.g., an operating state of the dispenser during which a user is not actively occupying/engaging the dispenser for purposes of receiving a product from the dispenser or ordering a product available at other locations at the dispensing environment, etc.), or a dispensing state (e.g., an operating state of the dispenser during which the dispenser is being actively occupied by a user engaging the dispenser to receive a product (e.g., fuel, electricity, etc.) from the dispenser or to order a product available at other locations at a dispensing environment (e.g., in-store items, carwash visit, etc.) via the dispenser, etc.).

At 320, second data characterizing a playlist of media content to be displayed on one or more of the plurality of dispensers, the playlist of media content identifying one or more media files including at least one graphical user interface depiction to be provided on a display screen of one or more of the plurality of dispensers can be received. The at least one graphical user interface depiction characterized by the second data of method 300 can include the first view 100A, the second view 100B, and/or the third view 100C described in relation to FIGS. 1A-1C. The playlist of media content can be stored in a memory 526 of the dispenser 520, in a memory 512 of a computing device 504 configured within the dispensing environment 502, and/or a memory 550 of a server 546 and can be received via the network 544.

In some embodiments, the dispenser 520 can be configured to periodically poll or call to the aforementioned memory devices via an application programming interface (API) for updated playlists. In some embodiments, the playlist of media content can be programmatically pushed to the dispenser 520 via the API. In some embodiments, the playlist of media file can be configured as a JavaScript Object Notation file.

At 330, a media file in the playlist including the at least one graphical user interface depiction and a period of time during which the at least one graphical user interface depiction is to be provided on the display screen of one or more of the plurality of dispensers is determined based on the playlist of media content. The processor 525 of the computing device 522 configured within the dispenser 520 can be configured to execute the playlist of media content received at 320.

In some embodiments, one or more applications stored in the memory 526 can be configured to execute to the playlist of media content and to determine a media file therein including a graphical user interface depiction to provide for display. For example, the processor 525 can determine the media file including a graphical user interface to provide for display based on a schedule associated with the media file, a type of display associated with the dispenser, a size of the display configured on or within the dispenser, a type of the dispenser, a particular dispensing environment or site at which the dispenser is located, and/or a condition or state of a dispenser. In some embodiments, the processor 525 can further determine the media file including a graphical user interface depiction to provide for display based on an ordered list of media files defined in the playlist or a duration of a previously played or currently playing media file, such that a next media file in an ordered list is determined and played after the previous or currently playing medial file. In some embodiments, one or more media files in a playlist can include an inactive tag such that the media file is skipped when executing a playlist to determine a media file including a graphical user interface depiction to be provided for display.

In some embodiments, the period of time can be a length of time that is unassociated with a time of the day (e.g., a 20-second period of time unaffiliated with a time of day). In some embodiments, the period of time can be a range of times of the day (e.g., 12:00:00 am to 12:00:20 am). In some embodiments, the period of time can be also affiliated with a certain calendar day, a day of the week, or with any recurring intervals of days. For example, the period of time can be associated with Mondays only or Fridays only, or with the first day of the month or the last day of the month, or with every Tuesday through Thursday, or with every Tuesday-Thursday in alternating weeks.

As explained above, the period of time can be determined based on the received first data. For example, the range of times of the day during which the at least one graphical user interface depiction is to be provided on the display screen of each of the plurality of dispensers can be based on whether the one or more of the plurality of dispensers is operating in an idle operating state (such as that described above). In some embodiments, the period of time can be generated based on a predetermined schedule. For example, the period of time can be a designated "off-peak" period of time during which one or more of the plurality of dispensers is expected to be operating in the idle operating state described above for a greater amount of time than an amount of time during which one or more of the plurality of dispensers is expected to be operating in the dispensing operating state described above.

At 340, the at least one graphical user interface depiction can be caused to be provided on the display screen of the one or more of the plurality of dispensers during the period of time. In some embodiments, instances of the at least one graphical user interface depictions can be provided in an alternating or cyclic manner. For example, a first instance of a first graphical user interface depiction can be provided for a first period of time and a second instance of a second graphical user interface depiction can be provided for a second period of time at the end of the first period of time. At the end of the second period of time, the first instance of the first graphical user interface depiction can be provide again and this process can repeat in a cyclic manner. In some embodiments, the period of time associated with first or second instances of the first and second graphical user interface depictions can vary. In some embodiments, the period of time associated with first or second instances of the first and second graphical user interface depictions can be the same.

The at least one graphical user interface depiction can be received for provision in a number of ways. For example, in some embodiments, the at least one graphical user interface depiction can be stored on a memory of the dispenser. In some embodiments, the at least one graphical user interface depiction can be transmitted to the dispenser from a remote server/database in operable communication with the dispenser and stored on the memory of the dispenser. In some embodiments, instructions that cause the at least one graphical user interface depiction to be displayed in the user interface during the period of time can be transmitted to the dispenser from the remote server/database for implementation by at least one data processor in operable communication with the remote server/database and the interactive graphical display of the dispenser. In some embodiments, the instructions causing the at least one graphical user interface depiction to be presented in the user interface can be retrieved from the memory of the dispenser and implemented by at least one data processor in operable communication with the memory and the interactive graphical display of the dispenser.

Figure 4:
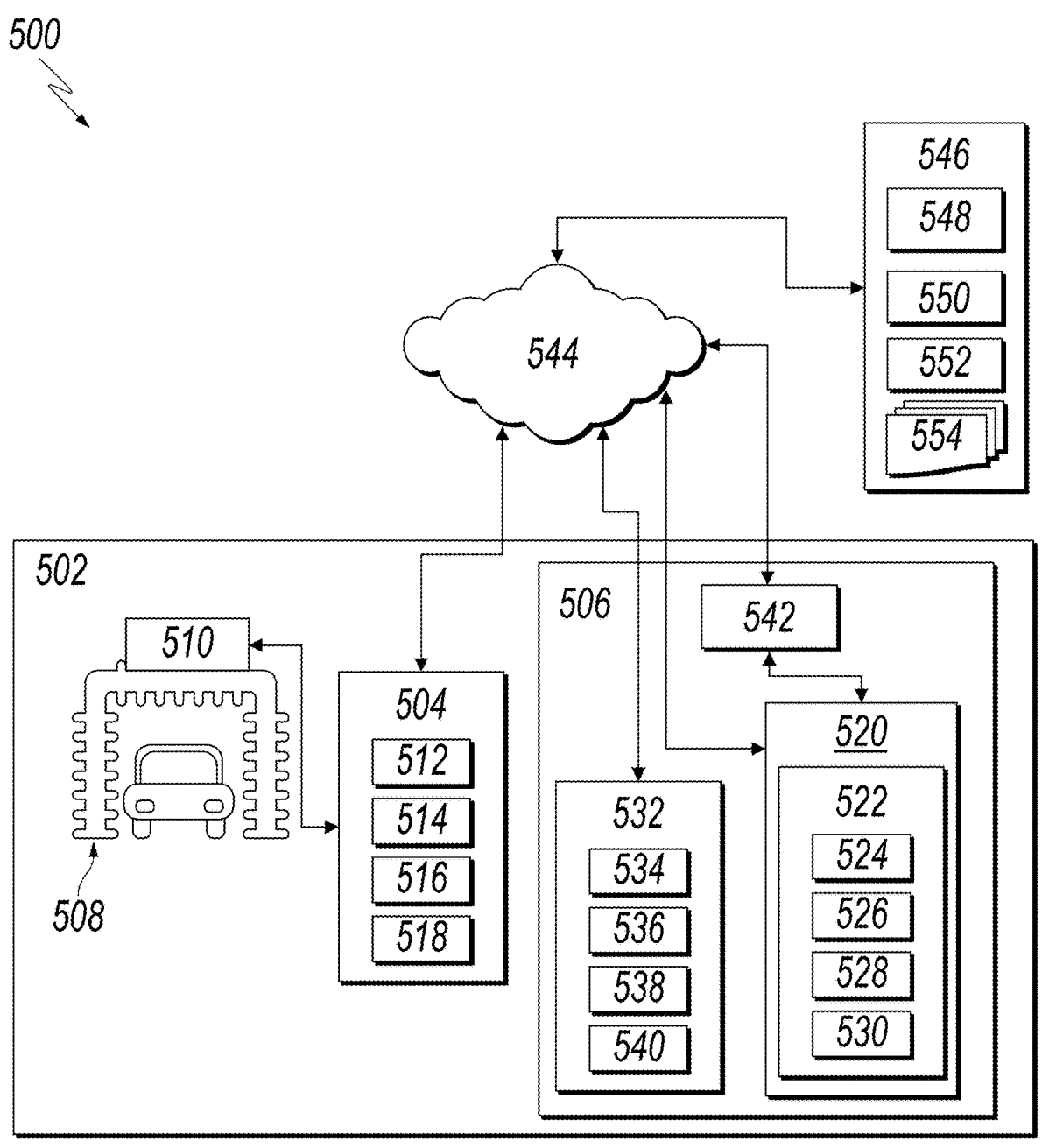
FIG. 4 is a diagram illustrating an exemplary embodiment of a system for providing coordinated deployment of enlarged graphical communications in dispensing environments according to the method of FIG. 2.

FIG. 4 is a system diagram illustrating an example system 500 that incorporates some implementations of the current subject matter and that can provide for the same for providing coordinated graphical communications within a dispensing environment. As shown in FIG. 4, some components of the system 500 can be configured in a dispensing environment 502, such as a retail location at which fuel is sold along with other products and services. Within the dispensing environment 502, one or more computing devices 504 and a forecourt 506 can be provided. The computing devices 504 can be associated with a retail operation, such as a convenience store at which food products and automotive services can be sold. For example, the computing device 504 can correspond to a point of sale (POS) device. In some embodiments, the computing device 504 may not be a POS device but can be a computing device arranged within the dispensing environment at which data associated with a vehicle or operator of the vehicle can be acquired.

In some embodiments, the computing device 504 can be a POS device associated with a carwash 508 configured within the dispensing environment 502. The car wash 508 can include one or more sensors 510 that can exchange data with the computing device 504. For example, the sensors 510 can convey car wash availability data and/or car wash utilization data to the computing device 504. For example, the sensors 510 can include image sensors, flow rate sensors, or the like associated with operation and utilization of the car wash 508. In some embodiments, the sensors 510 can generate image data used to determine one or more vehicle attributes and/or image data identifying an operator of a vehicle.

The computing device 504 can include a memory 512 storing computer-executable instructions, which when executed by a processor 514, cause the processor to execute one or more applications associated with operation and control of the car wash, as well as car wash transactions. The computing device 504 can also include a display 516 configured to provide graphical communications as described herein. The computing device 504 can also include one or more input devices 518 such as a microphone, optical scanner, keypad, or the like at which a vehicle operator can provide inputs or data associated with the vehicle or their identity. In some embodiments, inputs can be provided by a user in regard to a graphical communication via the display 516 and/or the input devices 518.

The dispensing environment 502 can also include a forecourt 506. The forecourt 506 can include an area of the dispensing environment in which fuel bays are located for dispensing fuel via one or more dispensers 520. In some embodiments, the dispensing environment 502 can include dispensers configured to dispense other types of "fuel" besides petroleum fuel. For example, the dispensers 520 can be configured to dispense electricity, gas (e.g., hydrogen, liquid propane gas (LPG) or compressed natural gas (CNG), water, or the like. It will be understood that the dispensing environment 502 and the dispensers 520 described herein are not limited to petroleum gasoline in liquid format and that other types of dispensers configured to dispense alternate types of "fuel" can be envisioned.

The dispenser 520 can include a computing device 522. The computing device 522 can include at least one data processor 524 configured to perform one or more aspects of the functionality described herein, and memory 526 for storing computer-executable instructions for performing one or more aspects of the functionality described herein. For example, the memory 526 can store one or more applications, such as a dispenser settings application configured to execute functionality associated with displaying graphical communications described herein via a display 528 of the dispenser 520. The dispenser settings application can include functionality associated with one or more settings of the dispenser 522, such as a language setting, a light/dark display mode setting, a volume setting, or the like. The dispenser settings application can also be reached from another computing device communicatively coupled to the computing device 522. The memory 526 can further store one or more playlists of media content described herein, which when executed by the data processor 524 can cause at least one graphical user interface depiction associated with views 100A, 100B, or 100C to be displayed on the display 528. The computing device 520 can also include a display 528 that is configured to present graphical communications to the dispenser user. The computing device 520 can also include one or more input devices 530 such as a microphone, optical scanner, keypad, or the like at which a vehicle operator can provide inputs and/or data associated with dispensing fuel. In some embodiments, inputs can be provided by a user via the display 528 and/or the input devices 530.

In some implementations, as shown in FIG. 4, the system 500 can include a computing device 532 associated with, corresponding to, or in possession of a vehicle operator. As shown, the computing device 532 can be located within the forecourt 506, such as when the vehicle operator is dispensing fuel via the dispenser 520. In other embodiments, the computing device 532 may not be located within the forecourt 506 or the dispensing environment 502. The computing device 532 can include at least one data processor 534 configured to perform one or more aspects of the functionality described herein, and a memory 536 for storing instructions for performing one or more aspects of the functionality described herein. The computing device 532 can also include a screen or display 538 that is configured to present graphical communications and other data related to the dispensing environment 502. The computing device 532 can also include one or more input devices 540 such as a microphone, optical scanner, camera, keypad, or the like at which a vehicle operator can provide inputs and/or data associated with operation of the computing device 532. In some embodiments, inputs can be provided by the user via the display 538 and/or the input devices 540. In some embodiments, the memory 536 may store a loyalty program application associated with the operator of the vehicle. The loyalty program application can include first data characterizing the vehicle and/or second data characterizing the identity of the vehicle operator.

The computing devices 504, 522, and 532 can be communicatively coupled to one another and to a server 546 via a network 544. The network 544 can include, for example, any one or more of a personal area network (PAN), a local area network (LAN), a campus area network (CAN), a metropolitan area network (MAN), a wide area network (WAN), a broadband network (BBN), a virtual private network (VPN), the Internet, or the like. Further, the network 544 can include, but is not limited to, any one or more of the following network topologies, including a bus network, a star network, a ring network, a mesh network, a star-bus network, tree or hierarchical network, or the like.

In some embodiments, the dispenser 520 can be communicatively coupled to the network 544 via a forecourt controller 542. The forecourt controller 542 can be configured to control operations of the dispenser 520. In some embodiments, the dispenser 520 can be communicatively coupled to the network 544 without a forecourt controller 542.

As further shown in FIG. 4, the system 500 can include a server 546 that is configured to perform operations that adaptively determine, generate, and provide graphical communications associated with the dispensing environment 502. In some embodiments, the server 546 (and/or the network 544) can be configured within the dispensing environment 502. The server 546 can include at least one data processor 548 configured to perform one or more aspects of the functionality described herein, and a memory 550 for storing computer-executable instructions for performing one or more aspects of the functionality described herein. In some embodiments, the server 546 can include a database 552 which can store data associated with the functionality described herein. For example, the database 552 can store media files, playlists of media, and configuration settings associated with synchronized display of graphical communications. In some embodiments, the memory 550 can further store one or more playlists of media content described herein, which when executed by the data processor 524 can cause at least one graphical user interface depiction associated with views 100A, 100B, or 100C to be displayed on the display 528.

As explained in further detail below, the server 546 can include one or more modules 554 or programs of computer-executable instructions performing one or more aspects of the subject matter described herein using the at least one data processor. In some embodiments, the media interface described herein configured to select media files associated with graphical communications and define playlists of media to be displayed on display 528 of dispenser 522 can be configured on any of computing devices 504, 522, and 546.

Figure 5B:
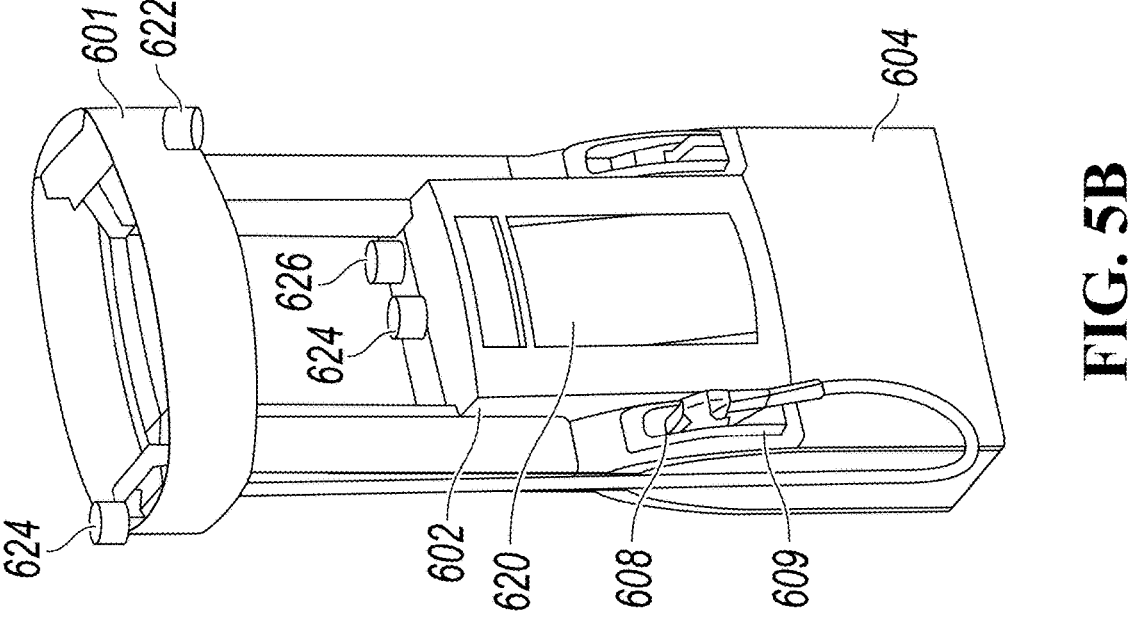
FIG. 5B is a front perspective view of the dispenser shown in FIG. 5A
Figure 5A:
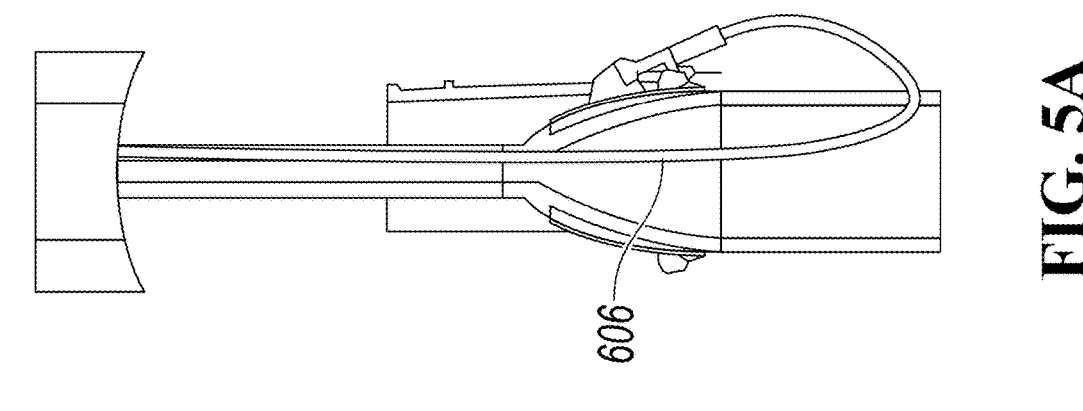
FIG. 5A is a side perspective view of one embodiment of a dispenser configured to provide enlarged graphical communications.
Figure 6:
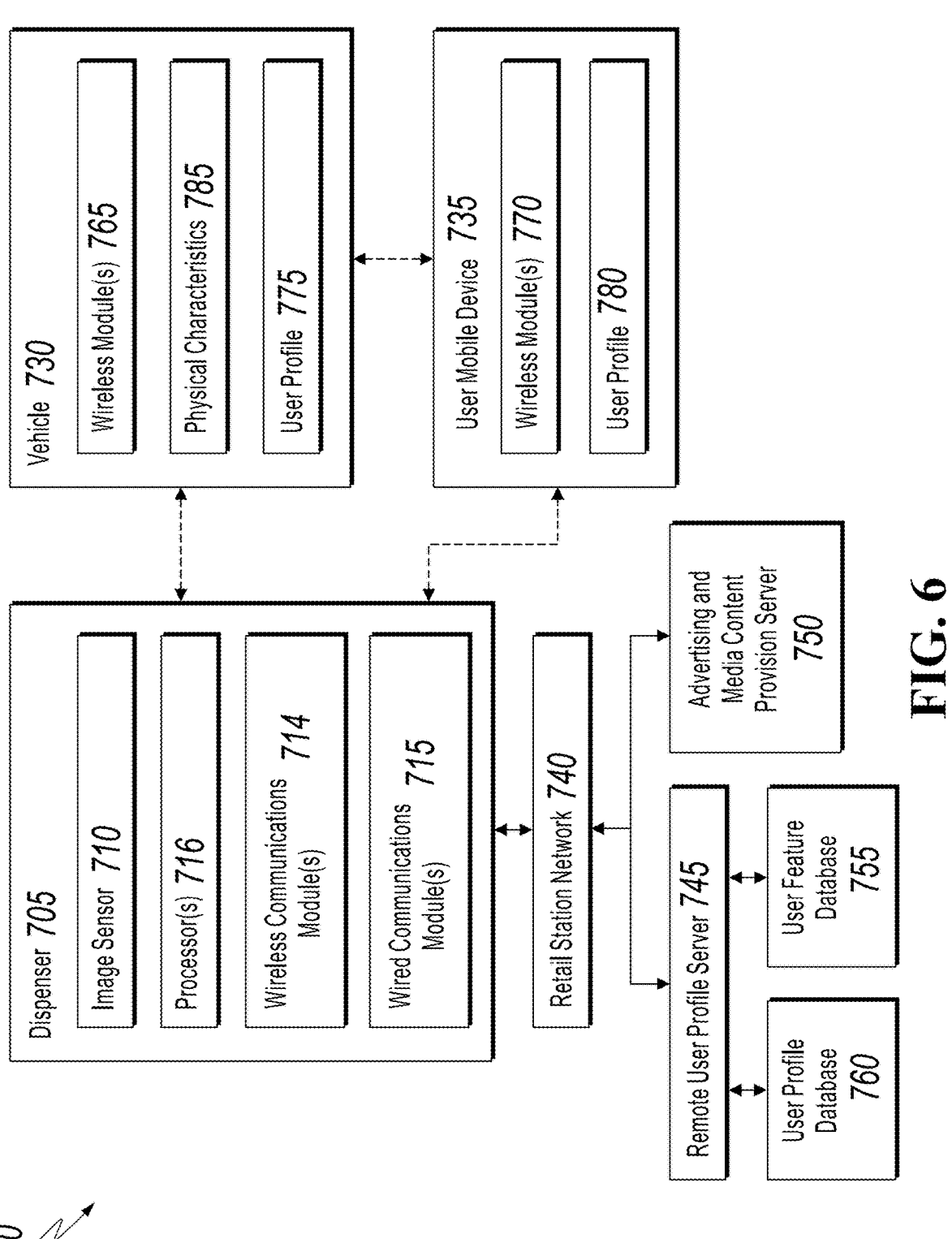
FIG. 6 is a system block diagram illustrating one embodiment of a dispensing system.

FIGS. 5A and 5B illustrate one embodiment of a dispenser 600 that can be used in some implementations of the current subject matter, and FIG. 6 illustrates components of the dispenser 600. The dispenser 600 can correspond to dispenser 520 described earlier. The dispenser 600 can be configured to dispense one or more liquid fuels (e.g., gasoline, diesel, ethanol-based fuels, biofuels, and the like), compressed natural gas (CNG), liquified petroleum gas (LPG), hydrogen, diesel exhaust fluid (DEF), fuel additives (e.g., acetone, ether, nitrous oxide, nitromethane, butyl rubber, ferox, oxyhydrogen, and the like), and/or electricity. In some embodiments, the dispenser 600 includes a dispenser body 601 having an electronics compartment 602, a pump compartment 604, and an image sensor 622. The pump compartment 604 houses a pump configured to pump fuel from a fuel tank or other reservoir, as well as one or more meters that can be configured to monitor fuel flow, flow of fuel additives, and/or flow of other components of the fuel. The pump compartment 604 can also include other components to facilitate fuel dispensing and mixing, such as motors and valves, a strainer/filtering system, a vapor recovery system, and the like. The pump compartment 604 is isolated from the electronics compartment 602 within the dispenser 600 to facilitate safety, security, and/or maintenance, as will be appreciated by a person skilled in the art. Fuel is thus not allowed to flow from the pump compartment 604 to the electronics compartment 602 and instead flows from the pump compartment 604 through hose 606 to a nozzle 608 for dispensing. As will be appreciated by a person skilled in the art, the nozzles 608 are each configured to dispense fuel from the dispenser 600 as pumped therefrom by the pump. The dispenser 600 also includes a nozzle receptacle 609 configured to store the nozzle 608 when not in use.

As referenced above, in some implementations, the dispenser 600 can include one or more components configured to send and/or receive data. For example, dispenser 600 can include a wireless transceiver 624 positioned on the electronics compartment 602 or elsewhere on the dispenser 600, such as on the dispenser body 601. The wireless transceiver 624 can be communicably coupled to the wireless communications module 618. In some embodiments, the wireless transceiver 624 can be a Bluetooth wireless transceiver configured to exchange data with a computing device via short-range radio signals. In some embodiments, one or more sensors 626 can be coupled to the dispenser 600. In some embodiments, the one or more sensors 626 can include image sensors configured to acquire image data associated with the vehicle or the operator of the vehicle at the dispenser 600. In some embodiments, the one or more sensors 626 can include an air quality sensor configured to detect the presence of fuel and/or combustion exhaust fumes or vapors. In some embodiments, the one or more sensors 626 can include a fluid sensor configured to detect a fluid leak from within the forecourt 506. In some embodiments, the one or more sensors 626 may not be configured in or on the dispenser 600, but instead can be configured at one or more locations within the forecourt 506 or the dispensing environment 502.

FIG. 6 is a system block diagram illustrating one embodiment of a dispensing system 700. The dispensing system 700 can correspond to the portions of the system 500 shown and described in relation to FIG. 4 and dispensers 705 can correspond to dispensers 520, 600 shown and described in relation to FIGS. 4 and 5A-5B except where noted otherwise. The dispensing system 700 can be configured within a dispensing environment, which can include a plurality of dispensers 705 arranged about a dispensing environment forecourt, a retail sales facility or operation, and/or a vehicle service or maintenance facility or operation. The dispensing system 700 includes a dispenser 705 capable of exchanging data with a dispenser user, a vehicle, and/or a computing device of the dispenser user. The dispenser 705 can perform operations that include, but are not limited to, receiving inputs related to selecting products available via the dispenser 705, performing dispensing transactions, exchanging loyalty program data with users, displaying graphical and textual content associated with goods and services available within the dispensing environment, and receiving user inputs regarding the available goods and services.

As shown in FIG. 7, the dispenser 705 can include an electronics compartment 706 and a pump compartment 707. The electronics compartment 706 can contain therein electronics for facilitating payment for dispensed products, such as fuel, and for facilitating dispensing of the dispensed products. In some embodiments, the electronics can facilitate payment for goods and services available within the dispensing environment, including but not limited to a food item, a beverage, a parking space, a pharmacy item, groceries to be delivered, a car wash, a tire pressure check, public transit, and the like. The electronics compartment 706 can include an image sensor 710, data processor(s) 716, wireless module(s) 714, wired communications module(s) 715, input devices 711, output devices 712 and a memory 719 or similar non-transitory storage medium configured to store computer-readable and executable instructions, which when executed by the processor 716 perform operations of the dispenser 705 described herein.

The image sensor 710 can include a thermometric camera, an infrared camera, a digital still camera, or a video camera, although other optical sensors are possible. In some embodiments, the image sensor 710 can be affixed to an exterior surface of the dispenser 705. In some embodiments, the image sensor 710 can be configured within the dispensing environment and communicably coupled to the processors 716. The input devices 711 can include an alphanumeric keypad, a numeric keypad, a microphone, or the like. The output devices 712 can include a speaker, a printer, or the like.

The display 713 can be capable of providing information to a user of the dispenser 705. The display 713 can have a variety of configurations, such as a cathode ray tube (CRT) screen, a liquid crystal display (LCD) screen, a light emitting diode (LED) screen, a touchscreen, and the like. For example, the display 713 can include a single display. Alternatively, the display 713 can include multiple displays. For example, a first display 713 can be on a front side of the dispenser 705 and a second display 713 can be on a back side of the dispenser 705. As another example, the display 713 can include two displays mounted next to each other to increase an overall display size. As yet another example, the display 713 can include first and second displays mounted next to each other on a front side of the dispenser 705 and can include third and fourth mounted next to each other on a back side of the dispenser 705.

The communications modules, such as either of the wireless communications module(s) 714 or the wired communications module(s) 715 are capable of exchanging data between the dispenser 705 and computing devices communicably coupled to the dispenser 705. For example, in some embodiments, the wireless communication module(s) 714 can be capable of communicating or exchanging data wirelessly with a remote system (e.g., a remote cloud server, a third-party payment authorization system, etc.) utilizing a variety of communication protocols, e.g., TCP/IP, etc. In some implementations, the wireless communication module(s) 714 can be capable of facilitating wireless communication over a short-range communication link. For example, the wireless communication module(s) 714 can include a transceiver configured to communicate via any of a variety of short-range wireless techniques, such as a Bluetooth protocol, a Wi-Fi protocol, near field communication (NFC), an ultra-wideband (UWB) protocol, a radio frequency identification (RFID) protocol, etc. Any of a variety of types of wireless connectivity hardware can be used for the short-range wireless connectivity, as will be appreciated by a person skilled in the art. The types of wireless connectivity that the wireless communication module(s) 714 includes can be chosen by an owner of the dispensing system 700 according to the owner's current dispensing site setup and/or future dispensing environment plans, and the wireless communication module(s) 714 may be manufactured and/or updated accordingly.

In some embodiments, the wireless module(s) 714 can operatively connect the dispenser 705 with a vehicle 730 and a computing device 735, which in this embodiment is a user mobile device 735, as shown in FIG. 6. The wireless module 714 can include, e.g., a transceiver communicating via Bluetooth protocol, cellular protocol, WIFI protocol, near field communication (NFC), and/or a radio frequency identification (RFID) protocol. The wired communications module 715 operatively connects the dispenser 705 with a remote user profile server 745 and a sponsored content and media content provision server 750 via a retail station network 740. The retail station network 740 can connect multiple dispensers 705 together over a local area network (LAN).

In some embodiments, the wired communication module(s) 715 can be configured to communicate or exchange data over a wired connection in addition to or instead of over a wireless connection. A wired connection can be used, for example, for a local communication link between the dispenser 705 and a local computing system external to the dispenser 705 (e.g., a forecourt controller, an in-store a point of sale (POS) device, etc.). A wired connection may provide more security and/or stability than a wireless connection and/or may allow a legacy dispenser 705 configured to communicate only via one or more wired connections to implement dynamic management of content provided via the display 713. Wired communication can occur via any of a variety of wired communication protocols, e.g., TCP/IP, etc., as will be appreciated by a person skilled in the art. Some dispensers 705 are manufactured with two-wire connectivity, and the wired communication can accordingly be via two wires, such as via a controller area network bus (CAN Bus) two wire connection, an RS485 two wire connection, a current loop connection, or other type of two wire connection. Some dispensers 705 are additionally or alternatively manufactured with cable connectivity and can accordingly be configured to provide wired communication via cable connection, such as an Ethernet cable or other network cable. Older dispensers 705 typically have two-wire connectivity capabilities while newer dispensers 705 typically have Ethernet connectivity capabilities instead.

The processor(s) 716 can include one or more processors forming part of at least one computing system. In one embodiment, the processor(s) 716 include at least an image processor 717 and a communications processor 718 as shown in FIG. 7. An image processor can receive one or more images from the image sensor 710 and determine identity information of a customer using the images. Identity information can include, for example, facial feature of a customer, a vehicle feature, a license plate number, a non-facial body feature, and the like. The image processor 717 can receive an image from image sensor 710, for example, when the dispenser 705 detects that a customer or user is proximate to the dispenser 705 and/or is in the field of view of the image sensor 710. The image can be of the customer (e.g., can contain a visual representation of the customer) and/or the customer's vehicle, for example. The image processor 717 is capable of performing operations, including but not limited to, receiving image data, and identifying physical characteristics of the user or a vehicle to determine regions within the image data in which the customer's face, body, and vehicle reside.

Using these regions, one or more image features related to the customer's face, body, and vehicle. For example, a facial feature can include skin texture; relative position, size, and/or shape of the eyes, nose, cheekbones, and jaw; and the like. Body features can include height, weight, hair color, body shape, and the like. Vehicle features can include shape, color, license plate number, manufacturer/make/model decal, and the like.

In at least some implementations, the image processor 717 is capable of classifying aspects of the image data as a vehicle, a non-facial body part, and/or a safety object or event. For example, the image processor 717 can classify (or determine) characteristics of the customer's vehicle based on the vehicle features. These characteristics can include, for example, license plate number, vehicle make, required grade and/or type of fuel for the vehicle, and vehicle model.

The image processor 717 is also capable of classifying (or determining) characteristics of the customer that do not directly derive the customer's identity based on the non-facial body features. For example, the image processor 717 is capable of determining a customer's height, weight age, gender, disability status (e.g., in a wheelchair or not in a wheelchair, etc.), and the like.

The image processor 717 is further capable of classifying (or determining) behavior of the customer that relates to safety and is based on an extracted feature present within the image data. For example, the image processor 717 can determine whether the customer is smoking, whether the customer is grounded prior to dispensing products or fuel, whether the vehicle engine is running during fueling, and whether the customer is about to "drive-off" (which can include leaving the fuel retailer without paying for dispensed products or fuel). Other determinations can include environmental, mechanical, electrical, and/or logical instruction conditions, such as, for example, temperature, pressure, humidity, fuel leaks, open panels, dispenser intrusion, power irregularities, watchdog timer expiration, and software exceptions.

Based on these classifications, the image processor 717 is capable of generating an alarm. The alarm can include a warning (e.g., signal, audio, light, and the like) to an attendant of the dispensing environment, such as at a site of the dispenser 705. The warning can include an audible sound emanating from the dispenser 705, a visual or graphical warning on the display 713 of the dispenser 705 indicating that products cannot be dispensed until the detected problem is corrected, and the like. Generating the alarm can include causing a corrective action to be performed, for example, restarting the dispenser 705 (e.g., in the event that a mechanical, electrical, and/or logical problem with the dispenser 705 is detected by the image processor 717), shutting down the dispenser 705 (e.g., in the event that an unsafe condition is detected by the image processor 717, such as the customer smoking before or during fueling, the customer not being grounded prior to dispensing fuel or products, the vehicle engine running during fueling, or a mechanical, electrical, and/or logical problem with the dispenser 705 being detected that cannot be fixed without manual intervention), downloading instructions for the dispenser 705 (e.g., to correct a mechanical, electrical, and/or logical problem with the dispenser 705), and/or generating notifications for other components at the fueling facility that includes the dispenser 705 (e.g., in the event an unsafe condition is detected by the image processor 717 that may affect safe functioning one or more other dispensers 705 within the dispensing environment).

In at least some implementations, image data including the facial features of a user or customer can be conveyed via the dispenser's communications module(s), such as the wireless module(s) 714 and/or the wired communications module(s) 715 to a remote user profile server 745, as described more fully below.

Referring again to FIG. 6, the dispenser 705 can transmit image data including facial features of a user or customer to a remote user profile server 745 in order to match the customer with a known customer identity. The remote user profile server 745 can receive the facial features and access a database 755 (which may include one or more databases) containing known customer features. The database 755 can contain features of customers that have previously visited the dispenser 705 or that have previously enrolled in a customer rewards program associated with the facility providing the dispenser 705 and provided an image of their face in association with the program. The database 755 can also associate unique identities (e.g., names or unique identifiers) with known facial features, e.g., in a table. The remote user profile server 745 can compare the received facial features with the features in the database 755 to find a match. If and once a match is found, the remote user profile server 745 can use the associated customer identifier to query a user profile database 760. The user profile database 760 can contain user profiles for each known customer in the feature database 755 (which may include one or more databases). User profiles can include preferences related to dispensed products (e.g., a preferred product grade, a product type, a payment method, a loyalty rewards identifier, whether to apply loyalty rewards to a present purchase, whether to purchase a car wash, and the like). The user profile and/or identity can be transmitted from the remote user profile server 745 to the dispenser 705.

The user profile and/or identity may be received by the communications processor 718 and can be stored in the memory 719. The user profile can be used by the communications processor 718 to provide a customized product dispensing experience. For example, the user profile can be accessed and the dispenser 705 can be configured with the customer's preferences. This can include rendering, on the display 713, a preference selection screen populated with the customer's dispensing preferences as specified in the user profile. In at least some implementations, the dispenser 705 can render a personalized greeting on the display 713.

In at least some implementations, identity information can be received by the communications processor 718. The identity information can include a name or unique identifier of the customer. This identity information can be used by the communications processor 718 to acquire the user profile from the remote user profile server 745. In at least some implementations the identity information can include, for example, facial features of the customer, vehicle features, license plate number, non-facial body features, and the like.

In at least some implementations, the user identity can be provided to a sponsored content and media content provision server 750, which can provide customized or targeted sponsored content items and content to the dispenser 705 for provision to the customer during dispensing of products, e.g., by displaying the advertisements and content on the display 713. For example, once the user identity is determined, sponsored content items can be dynamically determined and provided.

The sponsored content items can be pre-specified by remote merchants. Remote merchants can be any appropriate sellers of goods and/or services. For example, a merchant may sell durable goods (e.g., vehicle parts, toys, etc.), perishable goods (e.g., food, drink, etc.), intangible goods (e.g., software, digital media, etc.), or services (e.g., oil changes, car washes, etc.). Remote merchants can include any appropriate computer systems (e.g., servers and databases) for allowing them to send data regarding their goods and/or services over a communication network to dispensers. Remote merchants can operate proactively, interactively, and/or or passively with dispensers to market and/or sell their goods and/or services. For example, the remote merchants can download merchandising content (sponsored content and pricing data) to the dispensers 705 at designated times or events, or the remote merchants can download merchandising content to the dispensers 705 upon request. In at least some implementations, the remote merchants can maintain a Web-based portal through which the dispensers

705 can download the content. As discussed herein, remote merchants are remote in the sense that they are not located at the dispensing environment that includes the dispensers 705 to which the remote merchants provide sponsored content and/or other content. Thus, the remote merchants can be located in the neighborhood of the dispensing environment. One or more the merchants, of course, could be located at greater distances (e.g., across the state or country) from the dispensing environment.

Dynamic sponsored content can include a listing of goods and/or services, along with descriptions and pricing information. The sponsored content and sponsored content items can include text, graphics, audio, and/or video for presentation at the dispenser 705.

Using the user profile and/or user identity information, the dispensers 705 can determine when to present the above-described merchant-provided data. For example, a dispenser 705 may present the data (e.g., on a display thereof) at certain points of a product dispensing session (e.g., while a product or a fuel is being dispensed or after dispensing the product or fuel is complete). The dispenser 705 can then determine whether the customer indicates interest in the merchant data (e.g., by detecting user input regarding the presented data). If the dispenser 705 detects user interest in the merchant-provided data, the dispenser 705 can present additional information regarding the goods and/or services and determine whether the customer desires to order a good and/or service. Additional information regarding goods or services can include textual descriptions, images, audio, and/or video.

If a customer desires to order a good and/or service, the dispenser 705 can acquire order data (e.g., quantity, price, and delivery information) or the order data can be included or inferred from the customer's user profile. The dispenser 705 can also acquire payment data or payment data may be included or inferred from the user profile. The dispenser 705 can also evaluate whether the payment data is sufficiently complete. If the payment data is acceptable, the dispenser 705 can then generate a message for the appropriate remote merchant regarding the order and payment information and generate a receipt for the customer. The appropriate merchant can then make arrangement for delivery of the good and/or service.

To facilitate customer interaction in at least some embodiments, the user profile can include customer-related data. The customer-related data can, for example, be associated with a customer identifier (e.g., a credit card number, a personal identification number (PIN), a telephone number, a radio frequency identifier (RFID) number, or a loyalty program number). The customer-related data can be information regarding a product dispensing session (e.g., a type of product or fuel, a display language for the dispenser display, audio settings for the dispenser, or payment preferences (e.g., certain credit card, certain debit card, cash to be paid at a staffed payment terminal, etc.)), data regarding services at the dispensing environment (e.g., car wash, air pump, or water hose), or data regarding the customer (e.g., address and preferred payment types). In at least some implementations, the customer-related data can be used to identify other information that may be of interest to the customer. For example, particular types of merchandise (e.g., drinks, newspapers, or food) or promotional offers (e.g., coupons) can be presented to the customer based on customer-related data. This presentation can, for example, be based on the customer's past purchasing habits in a fueling facility store. The customer-related data can be acquired from the user profile and/or from a remote server using the customer identity.

In at least some implementations, the dispenser 705 can receive the user profile directly from a vehicle 730 (e.g., the customer's vehicle) and/or the mobile device 735. Each of the vehicle 730 and the mobile device 735 can include wireless module(s) 765, 770 (respectively) in communication with one another and with the wireless module(s) 714 of the dispenser 705. Communications between the vehicle 730 and the dispenser 705 can use an on-board diagnostics (OBD) mechanism of the vehicle 730, e.g., OBDII technology in which the vehicle 730 includes an OBDII port (cars manufactured after 1996 have an OBDII port). A copy of the user profile 780 can be contained on the customer's vehicle (for example, a smart vehicle having at least one data processor forming part of at least one computing system with the user profile stored in a memory of the at least one computing system) and/or a copy of the user profile 775 can be contained on the customer's mobile device 735 (e.g., in a memory thereof). When the dispenser 705 detects that the customer is proximate thereto (for example, via the image sensor 710 and/or the wireless module(s) 714), the wireless module(s) 714 can initiate a communication session with the vehicle 730 and/or the mobile device 735 and retrieve the customer's user profile. Once the user profile is received directly from the vehicle 730 or the mobile device 735, the customized dispensing experience can be provided as described above.

Returning to FIG. 7, the electronics compartment 706 can also include a payment mechanism 720 (e.g., a card reader, a Near Field Communication (NFC) module, etc.) configured to facilitate payment for dispensed products, such as fuel, (or other goods and services). The payment mechanism 720 can be configured to receive inputs such as, e.g., user identification information and/or payment information, and deliver the information to the controller 721. For example, the payment mechanism 720 can include a barcode and/or QR code scanner, and/or an NFC contactless card reader for receiving payment information, user identification information, vehicle information, and/or loyalty program information.

The electronics compartment 706 can also include a controller 721 configured to receive instructions from the processor(s) 716 and generate one or more control signals controlling operations of components of the dispenser 705 in accordance with the operations described herein. In some embodiments, the controller 721 can include a data processor and a memory storing computer-readable and executable instructions, forming part of at least one computing system within the electronics compartment 706. In some embodiments, controller 721 can be operably coupled to components of the electronics compartment 706, such as the display 713, the image sensor 710, the wireless communication module(s) 714, the wired communication module(s) 715, the processor(s) 716, the memory 719, and the payment mechanism 720, and the controller 721 can be configured to control operations thereof. In some embodiments, the controller 721 can be configured as a fuel controller and can be operatively coupled to components of the pump compartment 707, such as the pump 708 or the product meter 709. The controller 721 can generate control signals controlling operations of the pump 708 or the product meter 709.

The pump compartment 707 houses a pump 708 configured to provide a liquid dispensed product, such as fuel, from a storage tank or other reservoir. The pump compartment 707 can also include one or more product meters 709 that can be configured to monitor flow of dispensed products, flow of additives added to the dispensed product, and/or flow of other components of the dispensed product fuel. The pump compartment 707 can also include other components to facilitate product dispensing and mixing, such as motors and valves, a strainer/filtering system, a vapor recovery system, and the like. The pump compartment 707 is isolated from the electronics compartment 706 within the dispenser 705 to facilitate safety, security, and/or maintenance, as will be appreciated by a person skilled in the art. Dispensed products do not flow or are not conveyed from the pump compartment 707 to the electronics compartment 706 and instead the dispensed products, such as fuel, flow or otherwise are conveyed through the pump compartment 707 to a dispensing device of the dispenser 705, such as a hose and a nozzle at an end of the hose. The dispenser 705 can include any number of hoses and associated nozzles.

A person skilled in the art will appreciate that the dispenser 705 can have various other configurations. Various exemplary implementations of dispensers and methods of provisioning software thereto are described further in, for example, U.S. Pat. No. 10,214,411 entitled "Fuel Dispenser Communication" issued Feb. 26, 2019; U.S. Pat. No. 10,269,082 entitled "Intelligent Fuel Dispensers" issued Apr. 23, 2019; U.S. Pat. No. 10,577,237 entitled "Methods And Devices For Fuel Dispenser Electronic Communication" issued Mar. 3, 2020; U.S. Pat. No. 10,726,508 entitled "Intelligent Fuel Dispensers" issued Jul. 28, 2020; U.S. Pat. No. 11,276,051 entitled "Systems And Methods For Convenient And Secure Mobile Transactions" issued Mar. 15, 2022; U.S. Pat. No. 11,429,945 entitled "Outdoor Payment Terminals" issued Aug. 30, 2022; U.S. Pat. No. 11,443,582 entitled "Virtual Payment System and Method for Dispensing Fuel" issued Sep. 13, 2022; U.S. Pat. App. Pub. No. 2023/0196360 entitled "Conducting Fuel Dispensing Transactions" published Jun. 22, 2023, and U.S. Pat. App. Pub. No. 2023/0103400 entitled "Intelligent Electronic Fueling Station Component Provisioning" published Apr. 6, 2023, each of which are hereby incorporated by reference in their entireties.

FIG. 8 illustrates a perspective view of one embodiment of a dispenser 800. The dispenser 800 is an embodiment of dispenser 705 of FIGS. 6 and 7. The dispenser 800 can be configured to dispense liquid products (e.g., petroleum fuel). For example, in some embodiments, the dispenser 800 can be configured to dispense liquid products such as gasoline, diesel fuel, ethanol-based fuels, biofuels, diesel exhaust fluid (DEF), fuel additives (e.g., acetone, ether, nitrous oxide, nitromethane, butyl rubber, ferox, oxyhydrogen), water and the like.

As shown in FIG. 8, the dispenser 800 can include a dispenser body 802 in which the electronics compartment 706 and the pump compartment 707 are configured. The dispenser 800 can also include a dispenser awning 804 coupled to the dispenser body 802. In some embodiments, the dispenser body 802 can include the dispenser awning 804. In some embodiments, the dispenser body 802 can exclude the dispenser awning 804. The dispenser awning 804 can include at least one image sensor 710 and at least one wireless transmission module 714 configured thereon. In some embodiments, the dispenser body 802 can, additionally or alternatively, include an image sensor 710. As further shown, the dispenser body 802 can include a display 713, a payment mechanism 720, and a dispensing assembly 806.

The dispenser body 802 can include an electronics compartment 706 and a pump compartment 707. The pump compartment 707 is isolated from the electronics compartment 706 within the dispenser 800 to facilitate safety, security, and/or maintenance, as will be appreciated by a person skilled in the art. Dispensed products or fuel is thus not allowed to flow from the pump compartment 707 to the electronics compartment 706 and instead flows from the pump compartment 707 to the dispensing assembly 806. The dispensing assembly 806 can include a hose 808 coupled to a nozzle 810 for dispensing the liquid product. As will be appreciated by a person skilled in the art, the nozzle 810 can be configured to dispense the liquid product from the dispenser 800 as pumped therefrom by the pump 708. The dispensing assembly 806 can also include a nozzle receptacle 812 configured to store the nozzle 810 when not in use. In some embodiments, the dispenser 800 can include 1, 2, 3, 4, 5, or 6 dispensing assemblies 806. In some embodiments, one or more first dispensing assemblies 806 can be provided on a first side of the dispenser 800 and one or more second dispensing assemblies 806 can be provided on a second side of the dispenser 800 that is opposite the first side of the dispenser 800.

In some embodiments, the dispenser 800 can be configured to dispense diesel exhaust fluid (DEF) and can include a heater 814 within the pump compartment 707 of the dispenser body 802. The heater 814 can be configured to heat the DEF and portions of the pump compartment 707 and/or dispensing assemblies 806. Heating components of the dispenser 800 can be advantageous in climates where freezing temperatures are a concern.

In some implementations, the dispensers described herein can be configured to other types of dispensed products, in addition to or instead of a liquid dispensed product. For example, the dispenser can be configured to dispense products in a gaseous format, such as hydrogen, compressed natural gas (CNG), liquified natural gas (LNG), electricity, or the like. It will be understood that the dispensing environments, dispensing systems, and the dispensers described herein are not limited to dispensing products in liquid format and that the dispensing environments, dispensing systems, and the dispensers described herein can, additionally or alternatively, be configured to dispense products in non-liquid product formats, such as a vapor, a gas, or electricity. For example, in some implementations, the dispenser 800 can be a hydrogen dispenser. As another example, in some implementations, the dispenser 800 can be a compressed natural gas dispenser. As yet another example, in some implementations, the dispenser 800 can be an electrical dispenser configured to dispense electricity.

Figure 9:
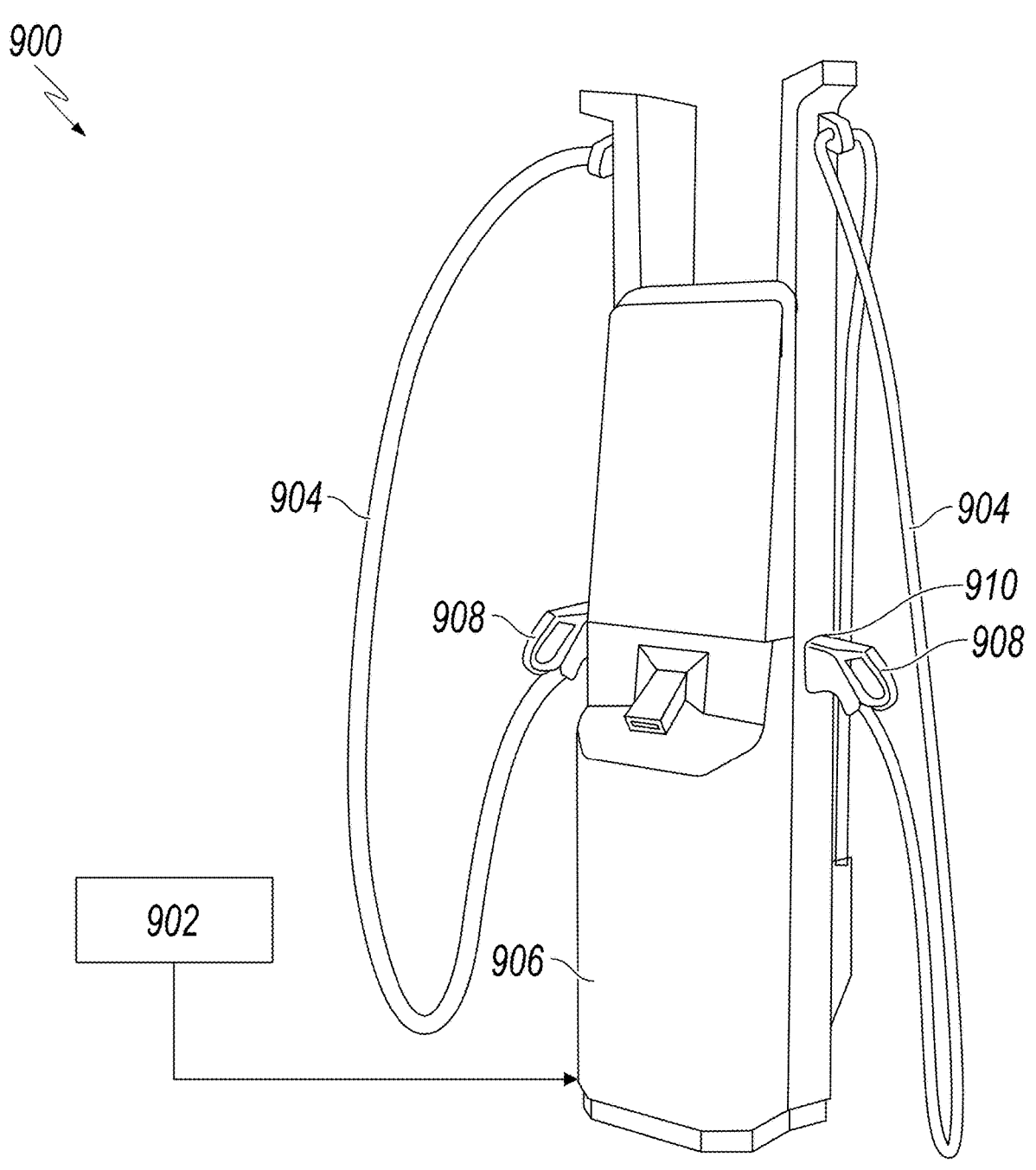
FIG. 9 is a side perspective view of an embodiment of a dispenser configured to dispense electricity.

The dispenser 900 of FIG. 9 is another embodiment of the dispenser 705 and 800 of FIGS. 6-8 except where noted otherwise. The dispenser 900 can be configured to dispense electricity. For example, the dispenser 900 can be configured as an electric vehicle charger. The dispenser 900 can be operatively coupled to a power supply 902, such as a local or regional power grid, a battery-back up power supply, a retail sales facility, or a vehicle service facility located in proximity of the dispenser 900.

The dispenser 900 can include a charging cable 904 coupled to a dispenser body 906 of the dispenser 900. In some embodiments, the dispenser 900 can include multiple charging cables 904 as shown in FIG. 9 and is not limited to a configuration having a single charging cable 904. The charging cable 904 can be configured to deliver electricity to a charging connector 908. The charging connector 908 can be configured to couple to a charging port of a vehicle and to deliver the electricity provided by the dispenser 900, via the charging cable 904, to the vehicle when the charging connector 908 is coupled to the vehicle charging port. When not in use, the charging connector 908 is configured to be stored in a charger receptacle 910 formed on the dispenser body 906.

Figure 10:
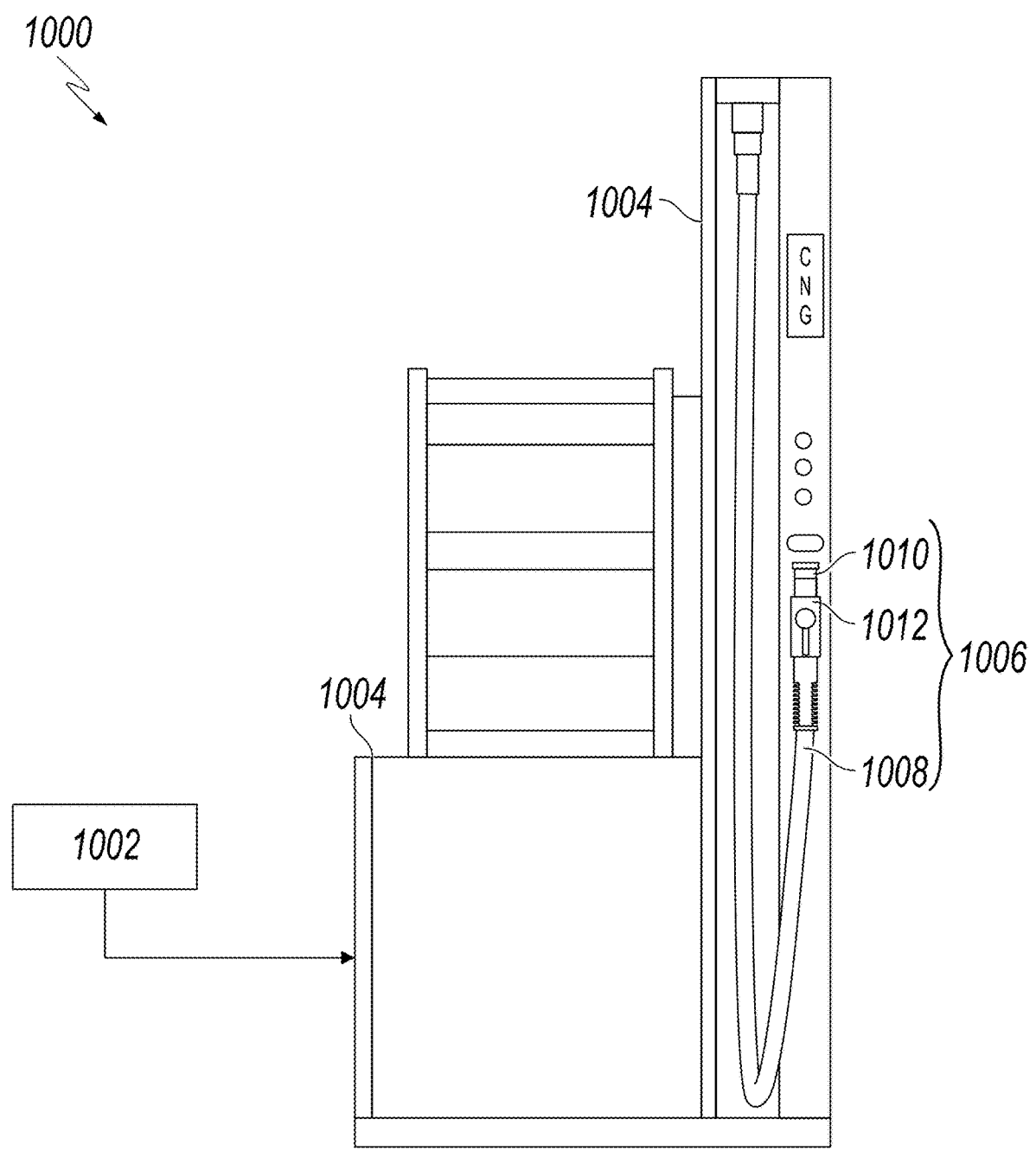
FIG. 10 is a front perspective view of an embodiment of a dispenser configured to dispense a gaseous product.

The dispenser 1000 shown in FIG. 10 is another embodiment of the dispenser 705 and 800 of FIGS. 6-8 except where noted otherwise. The dispenser 1000 can be configured to dispense gaseous products such as compressed natural gas (CNG). In some embodiments, the dispenser 1000 can alternatively be configured to dispense, liquified petroleum gas (LPG), hydrogen, and liquified natural gas (LNG). For example, the dispenser 1000 can be operatively coupled to a gas supply 1002 of CNG or other gaseous product, such as a local or regional pipeline, a stored gas supply located within the dispensing environment with the dispenser 1000, or a mobile tube trailer in proximity of the dispenser 1000.

The dispenser 1000 can also include one or more dispensing assemblies 1006 configured within the dispenser body 1004. The dispensing assembly 1006 can include a hose 1008 coupled to a nozzle 1010 for dispensing the gaseous CNG product. As will be appreciated by a person skilled in the art, the nozzle 1010 can be configured to dispense the CNG product from the dispenser 1000. The dispensing assembly 1006 can also include a nozzle receptacle 1012 configured to store the nozzle 1010 when not in use. In some embodiments, the dispenser 1000 can include 1, 2, 3, 4, 5, or 6 dispensing assemblies 1006. In some embodiments, one or more first dispensing assemblies 1006 can be provided on a first side of the dispenser 1000 and one or more second dispensing assemblies 1006 can be provided on a second side of the dispenser 1000 that is opposite the first side of the dispenser 1000.

In some embodiments, the dispensers described herein can be configured to dispense multiple product types. For example, a first portion of a dispenser including a first dispensing assembly can be configured to dispense a liquid product, such as petroleum or DEF, and a second portion of the same dispenser can include a second dispensing assembly configured to dispense a non-liquid product, such as electricity or a gaseous product, such as CNG, LNG, LPG, or Hydrogen. A variety of combinations of dispensing portions and assemblies necessary to dispense multiple, different dispensed products can be envisioned within a single dispenser body of a dispenser as described herein.

Exemplary technical effects of the methods, systems, apparatuses, and non-transitory machine-readable storage mediums described herein include, by way of non-limiting example, determining, generating, and providing graphical communications in dispensing environments. The system and method herein can enable more effective generation and provision of graphical communications based on states of dispensers within the dispensing environment. The graphical communications can be associated with a playlist including instructions associated with the order, duration, and type of content provided on displays of dispensers within the dispensing environment. In addition, graphical communications can be provided on dispenser displays in a synchronous or asynchronous manner and can include user-defined layouts that can include dispensed product/price data, selections for various grades of dispensed products, and sponsored content items for products or services available for sale within the dispensing environment. As a result, increased sales and revenue can be achieved while optimizing the utilization of the dispensers, as well as services and product offerings available within the dispensing environment. Customer loyalty and brand recognition can be enhanced by providing curated graphical communications in a consistent manner across different dispensers arranged within the dispensing environment.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:

receiving, by a data processor of a server, first data characterizing a state of one or more of a plurality of fuel dispensers communicably coupled to the server via a forecourt controller configured to control operations of the plurality of fuel dispensers, each of the one or more of the plurality for fuel dispensers having an associated memory storing one or more media files containing graphical communications for display on a display screen of any one of the one or more of the plurality of fuel dispensers;

receiving, by the data processor, a Java Script Object Notation (JSON) file characterizing a playlist of media content to be displayed on the one or more of the plurality of fuel dispensers, the JSON file characterizing the playlist of media content identifying one or more media files including at least one graphical user interface depiction to be provided on a display screen of the one or more of the plurality of fuel dispensers and comprising at least one two-part syntax parameter associated with displaying the at least one graphical user interface depiction on the display screen, the at least one two-part syntax parameter comprising a display condition syntax element characterizing a condition for displaying the at least one graphical user interface depiction followed by a display format syntax element characterizing a view format for displaying the at least one graphical user interface depiction within combined portions of the display screen based on the display condition syntax element;

determining, by the data processor and based at least in part on comparing the first data characterizing the state of the one or more of the plurality of fuel dispensers to the display condition syntax element in the at least one two-part syntax parameter in the Java Script Object Notation (JSON) file, a media file in the playlist including the at least one graphical user interface depiction, the view format for displaying the at least one graphical user interface depiction within combined portions of the display screen, and a period of time during which the at least one graphical user interface depiction is to be provided on the display screen of the one or more of the plurality of fuel dispensers;

transmitting, by the data processor and to the forecourt controller, an indication of the determined media file in the playlist including the at least one graphical user interface depiction, the determined view format, and the determined period of time; and causing, by the forecourt controller and based on the indication, the one or more of the plurality of fuel dispensers to display the determined media file including the at least one graphical user interface depiction on the display screen of the one or more of the plurality of fuel dispensers with the determined view format for displaying the at least one graphical user interface depiction within the combined portion of the display screen during the determined period of time.

2. The method of claim 1, wherein the state includes an idle operating state in which the one or more fuel dispensers are not dispensing a product therefrom or a dispensing operating state in which the one or more fuel dispensers are dispensing the product therefrom.

3. The method of claim 2, further comprising determining a first instance of the at least one graphical user interface depiction based on the idle operating state or determining a second instance of the at least one graphical user interface depiction based on the dispensing operating state, the second instance different than the first instance.

4. The method of claim 1, wherein the display condition syntax element describes an operating state of a retail facility collocated with the one or more fuel dispensers.

5. The method of claim 1, wherein the playlist of media content includes computer-readable instructions configured to cause the at least one graphical interface depiction to be displayed at one or more intermittent periods within the period of time.

6. The method of claim 1, wherein the at least one graphical user interface depiction is provided synchronously on display screens of a first plurality of fuel dispensers of the plurality of fuel dispensers during the period of time and the at least one graphical user interface depiction is provided asynchronously on display screens of a second plurality of fuel dispensers of the plurality of fuel dispensers, different than the first plurality of fuel dispensers, during the period of time.

7. The method of claim 1, wherein the period of time incudes a duration of time unassociated with a time of day, a duration of time within a range of time periods occurring during a day, or a duration of time associated with a day of a week, a month, or a recurring interval of future days.

8. The method of claim 1, wherein the at least one graphical user interface depiction includes a first graphical user interface depiction comprising a first data graphic associated with an amount of a dispensed product and a price of the dispensed product, a first sponsored content graphic, and a button interface graphic comprising a plurality of buttons associated with grades of a dispensed product, and a second graphical user interface depiction comprising a second data graphic associated with the amount of the dispensed product and the price of the dispensed product, and a second sponsored content graphic provided as a large-format graphical communication.

9. The method of claim 8, wherein the first graphical user interface depiction and the second graphical user interface depiction are provided on the display screen in a cyclic manner.

10. A system comprising:

a plurality of fuel dispensers, the plurality of fuel dispensers comprising:

one or more display screens; and one or more memories storing one or more media files containing graphical communications for display on any one of the one or more display screens;

a server communicably coupled to the plurality of fuel dispensers via a forecourt controller, the server comprising:

at least one data processor; and a memory storing instructions, which when executed, cause the at least one data processor to perform operations comprising:

receiving first data characterizing a state of one or more of the plurality of fuel dispensers;

receiving a Java Script Object Notation (JSON) file characterizing a playlist of media content to be displayed on one or more of the plurality of fuel dispensers, the JSON file characterizing the playlist of media content identifying one or more media files including at least one graphical user interface depiction to be provided on the one or more display screens of the one or more of the plurality of fuel dispensers and comprising at least one two-part syntax parameter associated with displaying the at least one graphical user interface depiction on the one or more display screens, the at least one two-part syntax parameter comprising a display condition syntax element characterizing a condition for displaying the at least one graphical user interface depiction followed by a display format syntax element characterizing a view format for displaying the at least one graphical user interface depiction within combined portions of the display screen based on the display condition syntax element;

determining, based at least in part on comparing the first data characterizing the state of the one or more of the plurality of fuel dispensers to the display condition syntax element in the at least one two-part syntax parameter in the Java Script Object Notation (JSON) file, a media file in the playlist including the at least one graphical user interface depiction, the view format for displaying the at least one graphical user interface depiction within combined portions of the display screen, and a period of time during which the at least one graphical user interface depiction is to be provided on the one or more display screens of the one or more of the plurality of fuel dispensers; and transmitting, to the forecourt controller, an indication of the determined media file in the playlist including the at least one graphical user interface depiction, the determined view format, and the determined period of time; and the forecourt controller, the forecourt controller communicably coupled to and configured to control operations of the plurality of fuel dispensers and comprising:

at least one data processor, the at least one data processor of the forecourt controller configured to cause the forecourt controller to perform operations comprising:

causing, based on the indication, the one or more of the plurality of fuel dispensers to display the determined media file including the at least one graphical user interface depiction on the one or more display screens of the one or more of the plurality of fuel dispensers with the determined view format for displaying the at least one graphical user interface depiction within the combined portion of the display screen during the determined period of time.

11. The system of claim 10, wherein the state includes an idle operating state in which the one or more fuel dispensers are not dispensing a product therefrom or a dispensing operating state in which the one or more fuel dispensers are dispensing the product therefrom.

12. The system of claim 11, wherein the operations further comprise determining a first instance of the at least one graphical user interface depiction based on the idle operating state or determining a second instance of the at least one graphical user interface depiction based on the dispensing operating state, the second instance different than the first instance.

13. The system of claim 10, wherein the display condition syntax element describes an operating state of a retail facility collocated with the one or more dispensers.

14. The system of claim 10, wherein the playlist of media content includes computer-readable instructions configured to cause the at least one graphical interface depiction to be displayed at one or more intermittent periods within the period of time.

15. The system of claim 10, wherein the at least one graphical user interface depiction is provided synchronously on display screens of a first plurality of fuel dispensers of the plurality of fuel dispensers during the period of time and the at least one graphical user interface depiction is provided asynchronously on display screens of a second plurality of fuel dispensers of the plurality of fuel dispensers, different than the first plurality of fuel dispensers, during the period of time.

16. The system of claim 10, wherein the period of time incudes a duration of time unassociated with a time of day, a duration of time within a range of time periods occurring during a day, or a duration of time associated with a day of a week, a month, or a recurring interval of future days.

17. The system of claim 10, wherein the at least one graphical user interface depiction includes a first graphical user interface depiction comprising a first data graphic associated with an amount of a dispensed product and a price of the dispensed product, a first sponsored content graphic, and a button interface graphic comprising a plurality of buttons associated with grades of a dispensed product, and a second graphical user interface depiction comprising a second data graphic associated with the amount of the dispensed product and the price of the dispensed product, and a second sponsored content graphic provided as a large-format graphical communication.

18. The system of claim 17, wherein the first graphical user interface depiction and the second graphical user interface depiction are provided on the display screen in a cyclic manner.

19. The method of claim 6, wherein a first dispenser of the first plurality of fuel dispensers is configured as a primary dispenser for causing the synchronous display of the at least one graphical user interface depiction displayed on a display screen of the first dispenser to be synchronously displayed on a display screen of a second dispenser of the first plurality of fuel dispensers configured as a secondary dispenser.

* * * * *